US007079550B2

(12) United States Patent
Padovani et al.

(10) Patent No.: US 7,079,550 B2
(45) Date of Patent: *Jul. 18, 2006

(54) METHOD AND APPARATUS FOR HIGH RATE PACKET DATA TRANSMISSION

(75) Inventors: Roberto Padovani, San Diego, CA (US); Paul E. Bender, San Diego, CA (US); Peter J. Black, La Jolla, CA (US); Matthew S. Grob, La Jolla, CA (US); Jurg K. Hinderling, San Diego, CA (US); Nagabhushana T. Sindhushayana, San Diego, CA (US); Charles E. Wheatley, III, Del Mar, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/318,489

(22) Filed: Dec. 12, 2002

(65) Prior Publication Data

US 2003/0142656 A1 Jul. 31, 2003

Related U.S. Application Data

(63) Continuation of application No. 08/963,386, filed on Nov. 3, 1997, now Pat. No. 6,574,211.

(51) Int. Cl.
*H04J 3/22* (2006.01)

(52) U.S. Cl. .................................. 370/468; 370/329
(58) Field of Classification Search ............. 370/328, 370/329, 331, 332, 335, 342, 458, 442, 336, 370/337, 352; 455/525, 517, 426
See application file for complete search history.

(56) References Cited

U.S. PATENT DOCUMENTS

| 4,256,925 A | 3/1981 | Goode ..................... 370/104 |
| 4,383,315 A | 5/1983 | Torng ....................... 370/89 |
| 4,491,947 A | 1/1985 | Frank ....................... 370/94 |
| 4,547,880 A | 10/1985 | De Vita et al. .............. 370/91 |
| 5,003,534 A | 3/1991 | Gerhardt et al. ........... 370/94.1 |
| 5,022,046 A | 6/1991 | Morrow, Jr. .................. 375/1 |
| 5,101,501 A | 3/1992 | Gilhousen et al. ............ 455/33 |
| 5,115,429 A | 5/1992 | Hluchyj et al. .............. 370/84 |
| 5,267,262 A | 11/1993 | Wheatley, III ................ 375/1 |
| 5,280,537 A | 1/1994 | Sugiyama et al. .............. 375/1 |

(Continued)

FOREIGN PATENT DOCUMENTS

EP 0412583 2/1991

(Continued)

*Primary Examiner*—Bob A. Phunkulh
(74) *Attorney, Agent, or Firm*—Philip Wadsworth; Sandra L. Godsey

(57) ABSTRACT

In a data communication system capable of variable rate transmission, high rate packet data transmission improves utilization of the forward link and decreases the transmission delay. Data transmission on the forward link is time multiplexed and the base station transmits at the highest data rate supported by the forward link at each time slot to one mobile station. The data rate is determined by the largest C/I measurement of the forward link signals as measured at the mobile station. Upon determination of a data packet received in error, the mobile station transmits a NACK message back to the base station. The NACK message results in retransmission of the data packet received in error. The data packets can be transmitted out of sequence by the use of sequence number to identify each data unit within the data packets.

51 Claims, 15 Drawing Sheets

U.S. PATENT DOCUMENTS

| | | | |
|---|---|---|---|
| 5,373,502 A | 12/1994 | Turban ........................ 370/18 |
| 5,400,328 A | 3/1995 | Burren et al. .................. 370/79 |
| 5,416,797 A | 5/1995 | Gilhousen et al. .......... 375/705 |
| 5,442,625 A * | 8/1995 | Gitlin et al. ................. 370/342 |
| 5,528,593 A * | 6/1996 | English et al. ............... 370/391 |
| 5,537,410 A | 7/1996 | Li ................................ 370/84 |
| 5,566,175 A | 10/1996 | Davis .......................... 370/84 |
| 5,603,093 A * | 2/1997 | Yoshimi et al. ............. 455/63.1 |
| 5,638,412 A | 6/1997 | Blakeney, II et al. |
| 5,726,978 A * | 3/1998 | Frodigh et al. .............. 370/252 |
| 5,822,318 A * | 10/1998 | Tiedemann et al. ......... 370/391 |
| 5,903,554 A | 5/1999 | Saints ........................ 370/342 |
| 5,914,959 A * | 6/1999 | Marchetto et al. .......... 370/468 |
| 5,946,346 A * | 8/1999 | Ahmed et al. ............... 375/219 |
| 5,978,657 A * | 11/1999 | Suzuki ........................ 455/522 |
| 5,991,627 A * | 11/1999 | Honkasalo et al. ......... 455/437 |
| 6,002,919 A * | 12/1999 | Posti ........................ 455/554.2 |
| 6,137,991 A * | 10/2000 | Isaksson .................. 455/67.11 |
| 6,347,217 B1 * | 2/2002 | Bengtsson et al. ......... 455/67.7 |
| 6,570,860 B1 | 5/2003 | Hämäläinen et al. |
| 6,574,211 B1 | 6/2003 | Padovani et al. |

FOREIGN PATENT DOCUMENTS

| | | |
|---|---|---|
| EP | 0418865 | 3/1991 |
| EP | 0779755 | 6/1997 |
| GB | 2293947 | 4/1996 |

* cited by examiner

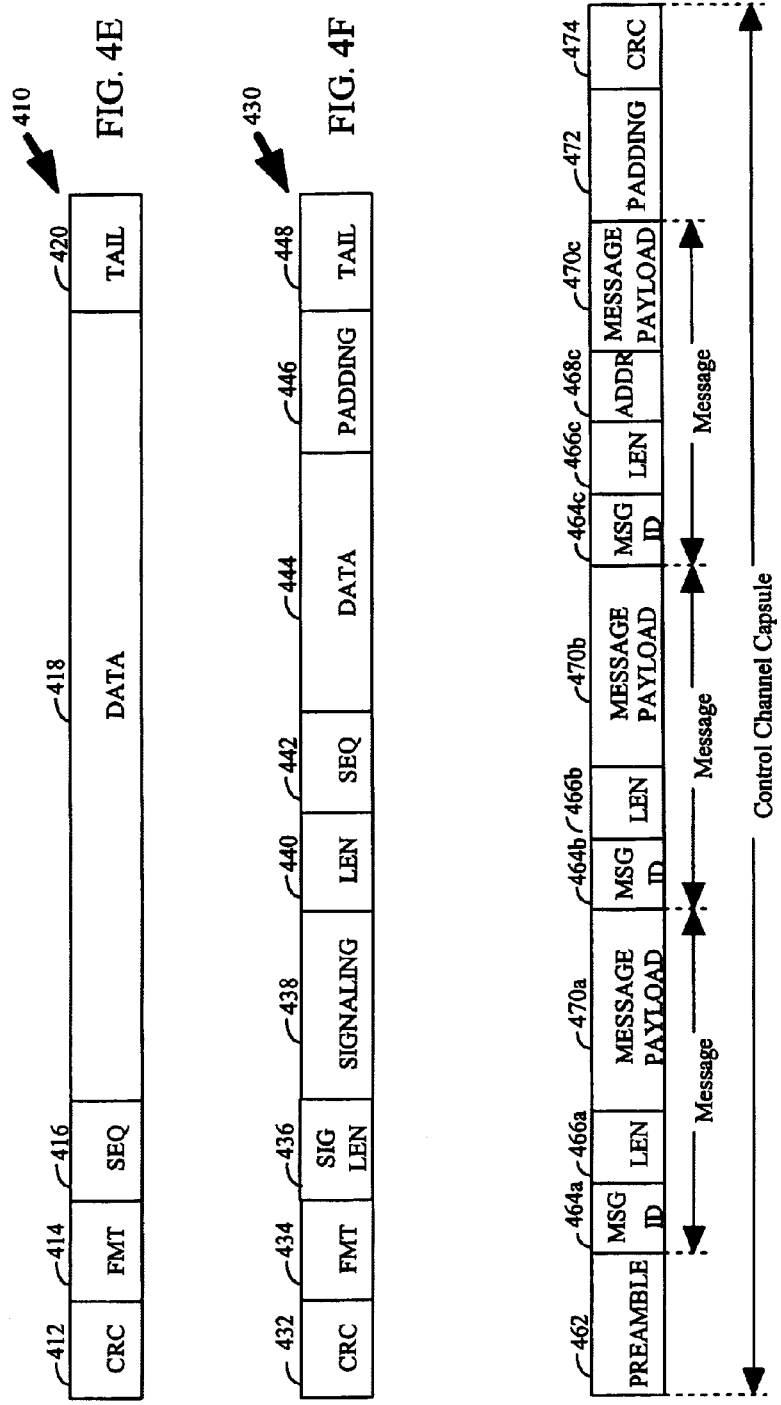

METHOD AND APPARATUS FOR HIGH RATE PACKET DATA TRANSMISSION

CLAIM OF PRIORITY UNDER 35 U.S.C. §120

The present Application for Patent is a Continuation and claims priority to patent application Ser. No. 08/963,386 entitled "METHOD AND APPARATUS FOR HIGH RATE PACKET DATA TRANSMISSION" filed Nov. 3, 1997, now U.S. Pat. No. 6,574,211, issued Jun. 3, 2003, and assigned to the assignee hereof and hereby expressly incorporated by reference herein.

BACKGROUND OF THE INVENTION

I. Field of the Invention

The present invention relates to data communication. More particularly, the present invention relates to a novel and improved method and apparatus for high rate packet data transmission.

II. Description of the Related Art

A modern day communication system is required to support a variety of applications. One such communication system is a code division multiple access (CDMA) system which conforms to the "TIA/EIA/IS-95 Mobile Station-Base Station Compatibility Standard for Dual-Mode Wideband Spread Spectrum Cellular System", hereinafter referred to as the IS-95 standard. The CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present invention and incorporated by reference herein.

In this specification, base station refers to the hardware with which the mobile stations communicate. Cell refers to the hardware or the geographic coverage area, depending on the context in which the term is used. A sector is a partition of a cell. Because a sector of a CDMA system has the attributes of a cell, the teachings described in terms of cells are readily extended to sectors.

In the CDMA system, communications between users are conducted through one or more base stations. A first user on one mobile station communicates to a second user on a second mobile station by transmitting data on the reverse link to a base station. The base station receives the data and can route the data to another base station. The data is transmitted on the forward link of the same base station, or a second base station, to the second mobile station. The forward link refers to transmission from the base station to a mobile station and the reverse link refers to transmission from the mobile station to a base station. In IS-95 systems, the forward link and the reverse link are allocated separate frequencies.

The mobile station communicates with at least one base station during a communication. CDMA mobile stations are capable of communicating with multiple base stations simultaneously during soft handoff. Soft handoff is the process of establishing a link with a new base station before breaking the link with the previous base station. Soft handoff minimizes the probability of dropped calls. The method and system for providing a communication with a mobile station through more than one base station during the soft handoff process are disclosed in U.S. Pat. No. 5,267,261, entitled "MOBILE ASSISTED SOFT HANDOFF IN A CDMA CELLULAR TELEPHONE SYSTEM," assigned to the assignee of the present invention and incorporated by reference herein. Softer handoff is the process whereby the communication occurs over multiple sectors which are serviced by the same base station. The process of softer handoff is described in detail in U.S. patent application Ser. No. 08/763,498, entitled "METHOD AND APPARATUS FOR PERFORMING HANDOFF BETWEEN SECTORS OF A COMMON BASE STATION", filed Dec. 11, 1996, now U.S. Pat. No. 5,933,787, issued Aug. 3, 1999, by Klein S. Gilhousen et al., assigned to the assignee of the present invention and incorporated by reference herein.

Given the growing demand for wireless data applications, the need for very efficient wireless data communication systems has become increasingly significant. The IS-95 standard is capable of transmitting traffic data and voice data over the forward and reverse links. A method for transmitting traffic data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention and incorporated by reference herein. In accordance with the IS-95 standard, the traffic data or voice data is partitioned into code channel frames which are 20 msec wide with data rates as high as 14.4 Kbps.

A significant difference between voice services and data services is the fact that the former imposes stringent and fixed delay requirements. Typically, the overall one-way delay of speech frames must be less than 100 msec. In contrast, the data delay can become a variable parameter used to optimize the efficiency of the data communication system. Specifically, more efficient error correcting coding techniques which require significantly larger delays than those that can be tolerated by voice services can be utilized. An exemplary efficient coding scheme for data is disclosed in U.S. patent application Ser. No. 08/743,688, entitled "SOFT DECISION OUTPUT DECODER FOR DECODING CONVOLUTIONALLY ENCODED CODEWORDS", filed Nov. 6, 1996, now U.S. Pat. No. 5,933,462, issued Aug. 3, 1999, by Andrew J. Viterbi et al., assigned to the assignee of the present invention and incorporated by reference herein.

Another significant difference between voice services and data services is that the former requires a fixed and common grade of service (GOS) for all users. Typically, for digital systems providing voice services, this translates into a fixed and equal transmission rate for all users and a maximum tolerable value for the error rates of the speech frames. In contrast, for data services, the GOS can be different from user to user and can be a parameter optimized to increase the overall efficiency of the data communication system. The GOS of a data communication system is typically defined as the total delay incurred in the transfer of a predetermined amount of data, hereinafter referred to as a data packet.

Yet another significant difference between voice services and data services is that the former requires a reliable communication link which, in the exemplary CDMA communication system, is provided by soft handoff. Soft handoff results in redundant transmissions from two or more base stations to improve reliability. However, this additional reliability is not required for data transmission because the data packets received in error can be retransmitted. For data services, the transmit power used to support soft handoff can be more efficiently used for transmitting additional data.

The parameters which measure the quality and effectiveness of a data communication system are the transmission delay required to transfer a data packet and the average throughput rate of the system. Transmission delay does not have the same impact in data communication as it does for voice communication, but it is an important metric for measuring the quality of the data communication system. The average throughput rate is a measure of the efficiency of the data transmission capability of the communication system.

It is well known that in cellular systems the signal-to-noise-and-interference ratio C/I of any given user is a function of the location of the user within the coverage area. In order to maintain a given level of service, TDMA and FDMA systems resort to frequency reuse techniques, i.e., not all frequency channels and/or time slots are used in each base station. In a CDMA system, the same frequency allocation is reused in every cell of the system, thereby improving the overall efficiency. The C/I that any given user's mobile station achieves determines the information rate that can be supported for this particular link from the base station to the user's mobile station. Given the specific modulation and error correction method used for the transmission, which the present invention seek to optimize for data transmissions, a given level of performance is achieved at a corresponding level of C/I. For idealized cellular system with hexagonal cell layouts and utilizing a common frequency in every cell, the distribution of C/I achieved within the idealized cells can be calculated.

The C/I achieved by any given user is a function of the path loss, which for terrestrial cellular systems increases as $r^3$ to $r^5$, where r is the distance to the radiating source. Furthermore, the path loss is subject to random variations due to man-made or natural obstructions within the path of the radio wave. These random variations are typically modeled as a lognormal shadowing random process with a standard deviation of 8 dB. The resulting C/I distribution achieved for an ideal hexagonal cellular layout with omnidirectional base station antennas, $r^4$ propagation law, and shadowing process with 8 dB standard deviation is shown in FIG. 10.

The obtained C/I distribution can only be achieved if, at any instant in time and at any location, the mobile station is served by the best base station which is defined as that achieving the largest C/I value, regardless of the physical distance to each base station. Because of the random nature of the path loss as described above, the signal with the largest C/I value can be one, which is other than the minimum physical distance from the mobile station. In contrast, if a mobile station was to communicate only via the base station of minimum distance, the C/I can be substantially degraded. It is therefore beneficial for mobile stations to communicate to and from the best serving base station at all times, thereby achieving the optimum C/I value. It can also be observed that the range of values of the achieved C/I, in the above idealized model and as shown in FIG. 10, is such that the difference between the highest and lowest value can be as large as 10,000. In practical implementation the range is typically limited to approximately 1:100 or 20 dB. It is therefore possible for a CDMA base station to serve mobile stations with information bit rates that can vary by as much as a factor of 100, since the following relationship holds:

$$R_b = W \frac{(C/I)}{(E_b/I_o)}, \quad (1)$$

where $R_b$ represents the information rate to a particular mobile station, W is the total bandwidth occupied by the spread spectrum signal, and $E_b/I_o$ is the energy per bit over interference density required to achieve a given level of performance. For instance, if the spread spectrum signal occupies a bandwidth W of 1.2288 MHz and reliable communication requires an average $E_b/I_o$ equal to 3 dB, then a mobile station which achieves a C/I value of 3 dB to the best base station can communicate at a data rate as high as 1.2288 Mbps. On the other hand, if a mobile station is subject to substantial interference from adjacent base stations and can only achieve a C/I of −7 dB, reliable communication cannot be supported at a rate greater than 122.88 Kbps. A communication system designed to optimize the average throughput will therefore attempts to serve each remote user from the best serving base station and at the highest data rate $R_b$ which the remote user can reliably support. The data communication system of the present invention exploits the characteristic cited above and optimizes the data throughput from the CDMA base stations to the mobile stations.

SUMMARY

The present invention is a novel and improved method and apparatus for high rate packet data transmission in a CDMA system. The present invention improves the efficiency of a CDMA system by providing for means for transmitting data on the forward and reverse links. Each mobile station communicates with one or more base stations and monitors the control channels for the duration of the communication with the base stations. The control channels can be used by the base stations to transmit small amounts of data, paging messages addressed to a specific mobile station, and broadcast messages to all mobile stations. The paging message informs the mobile station that the base station has a large amount of data to transmit to the mobile station.

It is an object of the present invention to improve utilization of the forward and reverse link capacity in the data communication system. Upon receipt of the paging messages from one or more base stations, the mobile station measures the signal-to-noise-and-interference ratio (C/I) of the forward link signals (e.g. the forward link pilot signals) at every time slots and selects the best base station using a set of parameters which can comprise the present and previous C/I measurements. In the exemplary embodiment, at every time slot, the mobile station transmits to the selected base station on a dedicated data request (DRC) channel a request for transmission at the highest data rate which the measured C/I can reliably support. The selected base station transmits data, in data packets, at a data rate not exceeding the data rate received from the mobile station on the DRC channel. By transmitting from the best base station at every time slot, improved throughput and transmission delay are achieved.

It is another object of the present invention to improve performance by transmitting from the selected base station at the peak transmit power for the duration of one or more time slots to a mobile station at the data rate requested by the mobile station. In the exemplary CDMA communication system, the base stations operate at a predetermined back-off (e.g., 3 dB) from the available transmit power to account for variations in usage. Thus, the average transmit power is half of the peak power. However, in the present invention, since high speed data transmissions are scheduled and power is typically not shared (e.g., among transmissions), it is not necessary to back-off from the available peak transmit power.

It is yet another object of the present invention to enhance efficiency by allowing the base stations to transmit data packets to each mobile station for a variable number of time slots. The ability to transmit from different base stations from time slot to time slot allows the data communication system of the present invention to quickly adapt to changes in the operating environment. In addition, the ability to transmit a data packet over non-contiguous time slots is possible in the present invention because of the use of sequence number to identify the data units within a data packet.

It is yet another object of the present invention to increase flexibility by forwarding the data packets addressed to a specific mobile station from a central controller to all base stations which are members of the active set of the mobile station. In the present invention, data transmission can occur from any base station in the active set of the mobile station at each time slot. Since each base station comprises a queue which contains the data to be transmitted to the mobile station, efficient forward link transmission can occur with minimal processing delay.

It is yet another object of the present invention to provide a retransmission mechanism for data units received in error. In the exemplary embodiment, each data packet comprises a predetermined number of data units, with each data unit identified by a sequence number. Upon incorrect reception of one or more data units, the mobile station sends a negative acknowledgment (NACK) on the reverse link data channel indicating the sequence numbers of the missing data units for retransmission from the base station. The base station receives the NACK message and can retransmit the data units received in error.

It is yet another object of the present invention for the mobile station to select the best base station candidates for communication based on the procedure described in U.S. patent application Ser. No. 08/790,497, entitled "METHOD AND APPARATUS FOR PERFORMING SOFT HAND-OFF IN A WIRELESS COMMUNICATIONS SYSTEM", filed Jan. 29, 1997, now U.S. Pat. No. 6,151,502, issued Nov. 21, 2000, by Roberto Padovani et al., assigned to the assignee of the present invention and incorporated by reference herein. In the exemplary embodiment, the base station can be added to the active set of the mobile station if the received pilot signal is above a predetermined add threshold and dropped from the active set if the pilot signal is below a predetermined drop threshold. In the alternative embodiment, the base station can be added to the active set if the additional energy of the base station (e.g., as measured by the pilot signal) and the energy of the base stations already in the active set exceeds a predetermined threshold. Using this alternative embodiment, a base station which transmitted energy comprises an insubstantial amount of the total received energy at the mobile station is not added to the active set.

It is yet another object of the present invention for the mobile stations to transmit the data rate requests on the DRC channel in a manner such that only the selected base station among the base stations in communication with the mobile station is able to distinguish the DRC messages, therefore assuring that the forward link transmission at any given time slot is from the selected base station. In the exemplary embodiment, each base station in communication with the mobile station is assigned a unique Walsh code. The mobile station covers the DRC message with the Walsh code corresponding to the selected base station. Other codes can be used to cover the DRC messages, although orthogonal codes are typically utilized and Walsh codes are preferred.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 4E–4G are diagrams of the two exemplary data packet formats and the control channel capsule, respectively;

DETAILED DESCRIPTION

Figure 1:
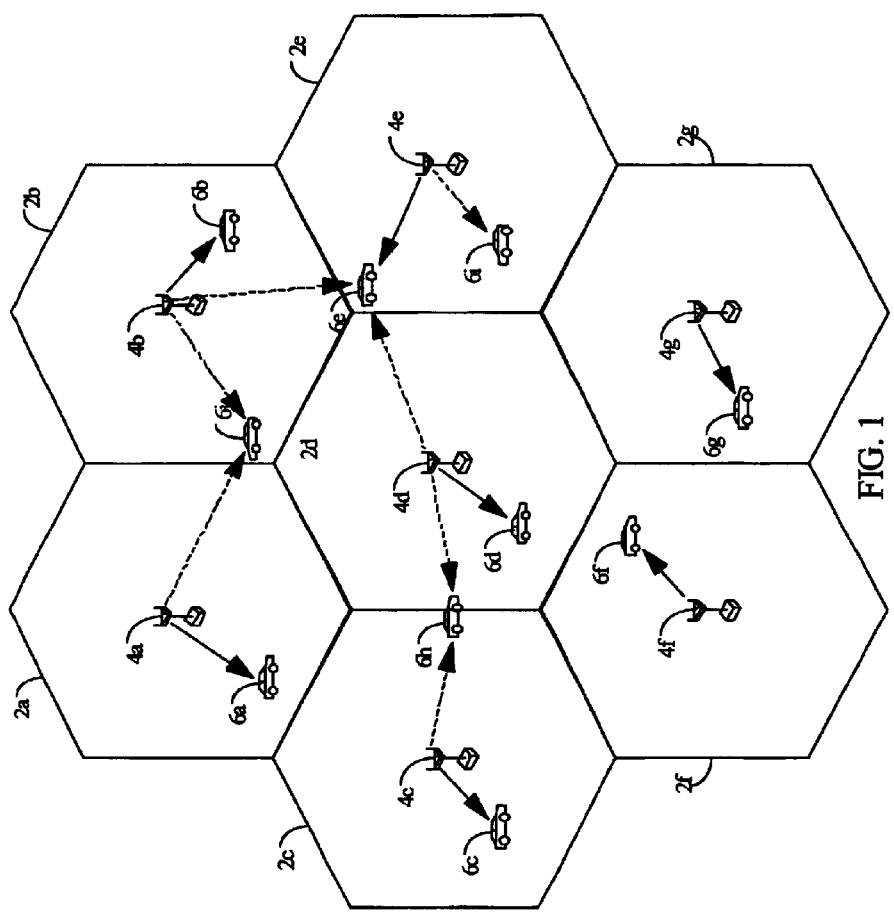
FIG. 1 is a diagram of a data communication system of the present invention comprising a plurality of cells, a plurality of base stations and a plurality of mobile stations.

In accordance with the exemplary embodiment of the data communication system of the present invention, forward link data transmission occurs from one base station to one mobile station (see FIG. 1) at or near the maximum data rate which can be supported by the forward link and the system. Reverse link data communication can occur from one mobile station to one or more base stations. The calculation of the maximum data rate for forward link transmission is described in detail below. Data is partitioned into data packets, with each data packet being transmitted over one or more time slots (or slots). At each time slot, the base station can direct data transmission to any mobile station which is in communication with the base station.

Initially, the mobile station establishes communication with a base station using a predetermined access procedure. In this connected state, the mobile station can receive data and control messages from the base station, and is able to transmit data and control messages to the base station. The mobile station then monitors the forward link for transmissions from the base stations in the active set of the mobile station. The active set contains a list of base stations in communication with the mobile station. Specifically, the mobile station measures the signal-to-noise-and-interference ratio (C/I) of the forward link pilot from the base stations in the active set, as received at the mobile station. If the received pilot signal is above a predetermined add threshold or below a predetermined drop threshold, the mobile station reports this to the base station. Subsequent messages from the base station direct the mobile station to add or delete the base station(s) to or from its active set, respectively. The various operating states of the mobile station are described below.

If there is no data to send, the mobile station returns to an idle state and discontinues transmission of data rate information to the base station(s). While the mobile station is in the idle state, the mobile station monitors the control channel from one or more base stations in the active set for paging messages.

If there is data to be transmitted to the mobile station, the data is sent by a central controller to all base stations in the active set and stored in a queue at each base station. A paging message is then sent by one or more base stations to the mobile station on the respective control channels. The base station may transmit all such paging messages at the same time across several base stations in order to ensure reception even when the mobile station is switching between base stations. The mobile station demodulates and decodes the signals on one or more control channels to receive the paging messages.

Upon decoding the paging messages, and for each time slot until the data transmission is completed, the mobile station measures the C/I of the forward link signals from the base stations in the active set, as received at the mobile station. The C/I of the forward link signals can be obtained by measuring the respective pilot signals. The mobile station then selects the best base station based on a set of parameters. The set of parameters can comprise the present and previous C/I measurements and the bit-error-rate or packet-error-rate. For example, the best base station can be selected based on the largest C/I measurement. The mobile station then identifies the best base station and transmits to the selected base station a data request message (hereinafter referred to as the DRC message) on the data request channel (hereinafter referred to as the DRC channel). The DRC message can contain the requested data rate or, alternatively, an indication of the quality of the forward link channel (e.g., the C/I measurement itself, the bit-error-rate, or the packet-error-rate). In the exemplary embodiment, the mobile station can direct the transmission of the DRC message to a specific base station by the use of a Walsh code, which uniquely identifies the base station. The DRC message symbols are exclusively OR'ed (XOR) with the unique Walsh code. Since each base station in the active set of the mobile station is identified by a unique Walsh code, only the selected base station which performs the identical XOR operation as that performed by the mobile station, with the correct Walsh code, can correctly decode the DRC message. The base station uses the rate control information from each mobile station to efficiently transmit forward link data at the highest possible rate.

At each time slot, the base station can select any of the paged mobile stations for data transmission. The base station then determines the data rate at which to transmit the data to the selected mobile station based on the most recent value of the DRC message received from the mobile station. Additionally, the base station uniquely identifies a transmission to a particular mobile station by using a spreading code, which is unique to that mobile station. In the exemplary embodiment, this spreading code is the long pseudo noise (PN) code, which is defined by IS-95 standard.

The mobile station, for which the data packet is intended, receives the data transmission and decodes the data packet. Each data packet comprises a plurality of data units. In the exemplary embodiment, a data unit comprises eight information bits, although different data unit sizes can be defined and are within the scope of the present invention. In the exemplary embodiment, each data unit is associated with a sequence number and the mobile stations are able to identify either missed or duplicative transmissions. In such events, the mobile stations communicate via the reverse link data channel the sequence numbers of the missing data units. The base station controllers, which receive the data messages from the mobile stations, then indicate to all base stations communicating with this particular mobile station which data units were not received by the mobile station. The base stations then schedule a retransmission of such data units. Each mobile station in the data communication system can communicate with multiple base stations on the reverse link. In the exemplary embodiment, the data communication system of the present invention supports soft handoff and softer handoff on the reverse link for several reasons. First, soft handoff does not consume additional capacity on the reverse link but rather allows the mobile stations to transmit data at the minimum power level such that at least one of the base stations can reliably decode the data. Second, reception of the reverse link signals by more base stations increases the reliability of the transmission and only requires additional hardware at the base stations.

In the exemplary embodiment, the forward link capacity of the data transmission system of the present invention is determined by the rate requests of the mobile stations. Additional gains in the forward link capacity can be achieved by using directional antennas and/or adaptive spatial filters. An exemplary method and apparatus for providing directional transmissions are disclosed in U.S. patent application Ser. No. 08/575,049, entitled "METHOD AND APPARATUS FOR DETERMINING THE TRANSMISSION DATA RATE IN A MULTI-USER COMMUNICATION SYSTEM", filed Dec. 20, 1995, now U.S. Pat. No. 5,857,147, issued Jan. 5, 1999, by William R. Gardner et al., and U.S. patent application Ser. No. 08/925,521, entitled "METHOD AND APPARATUS FOR PROVIDING ORTHOGONAL SPOT BEAMS, SECTORS, AND PICO-CELLS", filed Sep. 8, 1997, now U.S. Pat. No. 6,285,655, issued Sep. 4, 2001, by Stein A. Lundby et al., both assigned to the assignee of the present invention and incorporated by reference herein.

I. System Description

Referring to the figures, FIG. 1 represents the exemplary data communication system of the present invention which comprises multiple cells 2a–2g. Each cell 2 is serviced by a corresponding base station 4. Various mobile stations 6 are dispersed throughout the data communication system. In the exemplary embodiment, each of mobile stations 6 communicates with at most one base station 4 on the forward link at each time slot but can be in communication with one or more base stations 4 on the reverse link, depending on whether the mobile station 6 is in soft handoff. For example, base station 4a transmits data exclusively to mobile station 6a, base station 4b transmits data exclusively to mobile station 6*b*, and base station 4*c* transmits data exclusively to mobile station 6*c* on the forward link at time slot n. In FIG. 1, the solid line with the arrow indicates a data transmission from base station 4 to mobile station 6. A broken line with the arrow indicates that mobile station 6 is receiving the pilot signal, but no data transmission, from base station 4. The reverse link communication is not shown in FIG. 1 for simplicity.

As shown by FIG. 1, each base station 4 preferably transmits data to one mobile station 6 at any given moment. Mobile stations 6, especially those located near a cell boundary, can receive the pilot signals from multiple base stations 4. If the pilot signal is above a predetermined threshold, mobile station 6 can request that base station 4 be added to the active set of mobile station 6. In the exemplary embodiment, mobile station 6 can receive data transmission from zero or one member of the active set.

Figure 2:
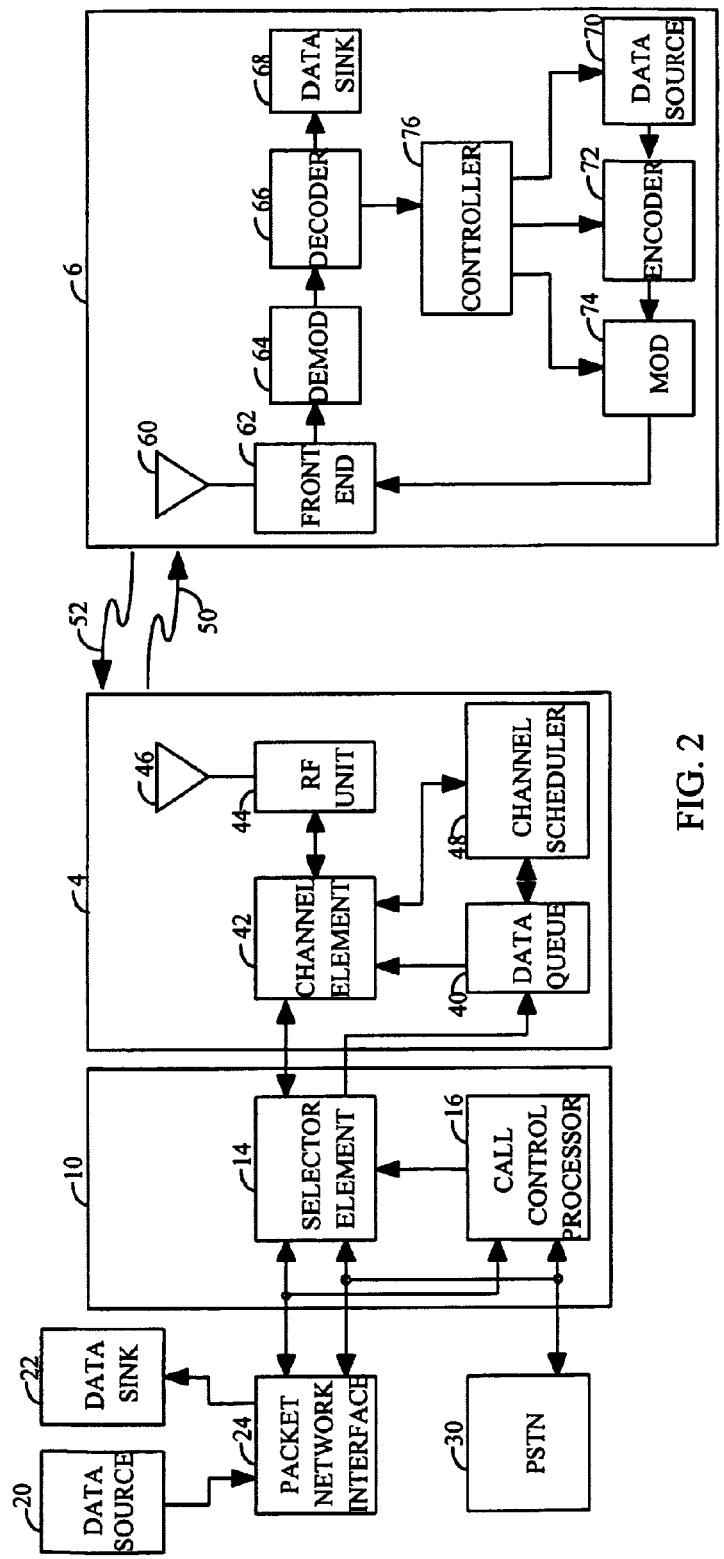
FIG. 2 is an exemplary block diagram of the subsystems of the data communication system of the present invention.

A block diagram illustrating the basic subsystems of the data communication system of the present invention is shown in FIG. 2. Base station controller 10 interfaces with packet network interface 24, PSTN 30, and all base stations 4 in the data communication system (only one base station 4 is shown in FIG. 2 for simplicity). Base station controller 10 coordinates the communication between mobile stations 6 in the data communication system and other users connected to packet network interface 24 and PSTN 30. PSTN 30 interfaces with users through the standard telephone network (not shown in FIG. 2).

Base station controller 10 contains many selector elements 14, although only one is shown in FIG. 2 for simplicity. One selector element 14 is assigned to control the communication between one or more base stations 4 and one mobile station 6. If selector element 14 has not been assigned to mobile station 6, call control processor 16 is informed of the need to page mobile station 6. Call control processor 16 then directs base station 4 to page mobile station 6.

Data source 20 contains the data which is to be transmitted to mobile station 6. Data source 20 provides the data to packet network interface 24. Packet network interface 24 receives the data and routes the data to selector element 14. Selector element 14 sends the data to each base station 4 in communication with mobile station 6. Each base station 4 maintains data queue 40, which contains the data to be transmitted to mobile station 6.

In the exemplary embodiment, on the forward link, a data packet refers to a predetermined amount of data, which is independent of the data rate. The data packet is formatted with other control and coding bits and encoded. If data transmission occurs over multiple Walsh channels, the encoded packet is demultiplexed into parallel streams, with each stream transmitted over one Walsh channel.

The data is sent, in data packets, from data queue 40 to channel element 42. For each data packet, channel element 42 inserts the necessary control fields. The data packet, control fields, frame check sequence bits, and code tail bits comprise a formatted packet. Channel element 42 then encodes one or more formatted packets and interleaves (or reorders) the symbols within the encoded packets. Next, the interleaved packet is scrambled with a scrambling sequence, covered with Walsh covers, and spread with the long PN code and the short $PN_I$ and $PN_Q$ codes. The spread data is quadrature modulated, filtered, and amplified by a transmitter within RF unit 44. The forward link signal is transmitted over the air through antenna 46 on forward link 50.

At mobile station 6, the forward link signal is received by antenna 60 and routed to a receiver within front end 62. The receiver filters, amplifies, quadrature demodulates, and quantizes the signal. The digitized signal is provided to demodulator (DEMOD) 64 where it is despread with the long PN code and the short $PN_I$ and $PN_Q$ codes, decovered with the Walsh covers, and descrambled with the identical scrambling sequence. The demodulated data is provided to decoder 66 which performs the inverse of the signal processing functions done at base station 4, specifically the de-interleaving, decoding, and frame check functions. The decoded data is provided to data sink 68. The hardware, as described above, supports transmissions of data, messaging, voice, video, and other communications over the forward link.

The system control and scheduling functions can be accomplished by many implementations. The location of channel scheduler 48 is dependent on whether a centralized or distributed control/scheduling processing is desired. For example, for distributed processing, channel scheduler 48 can be located within each base station 4. Conversely, for centralized processing, channel scheduler 48 can be located within base station controller 10 and can be designed to coordinate the data transmissions of multiple base stations 4. Other implementations of the above described functions can be contemplated and are within the scope of the present invention.

As shown in FIG. 1, mobile stations 6 are dispersed throughout the data communication system and can be in communication with zero or one base station 4 on the forward link. In the exemplary embodiment, channel scheduler 48 coordinates the forward link data transmissions of one base station 4. In the exemplary embodiment, channel scheduler 48 connects to data queue 40 and channel element 42 within base station 4 and receives the queue size, which is indicative of the amount of data to transmit to mobile station 6, and the DRC messages from mobile stations 6. Channel scheduler 48 schedules high rate data transmission such that the system goals of maximum data throughput and minimum transmission delay are optimized.

In the exemplary embodiment, the data transmission is scheduled based in part on the quality of the communication link. An exemplary communication system which selects the transmission rate based on the link quality is disclosed in U.S. patent application Ser. No. 08/741,320, entitled "METHOD AND APPARATUS FOR PROVIDING HIGH SPEED DATA COMMUNICATIONS IN A CELLULAR ENVIRONMENT", filed Sep. 11, 1996, now U.S. Pat. No. 6,496,543, issued Dec. 17, 2002, by Ephraim Zehavi, assigned to the assignee of the present invention and incorporated by reference herein. In the present invention, the scheduling of the data communication can be based on additional considerations such as the GOS of the user, the queue size, the type of data, the amount of delay already experienced, and the error rate of the data transmission. These considerations are described in detail in U.S. patent application Ser. No. 08/798,951, entitled "METHOD AND APPARATUS FOR FORWARD LINK RATE SCHEDULING", filed Feb. 11, 1997, now U.S. Pat. No. 6,335,922, issued Jan. 1, 2002, by Edward G. Tiedemann Jr. et al., and U.S. patent application Ser. No. 08/835,632, entitled "METHOD AND APPARATUS FOR REVERSE LINK RATE SCHEDULING", filed Aug. 20, 1997, now U.S. Pat. No. 5,914,950, issued Jun. 22, 1999, by Tao Chen et al., both are assigned to the assignee of the present invention and incorporated by reference herein. Other factors can be considered in scheduling data transmissions and are within the scope of the present invention.

The data communication system of the present invention supports data and message transmissions on the reverse link. Within mobile station 6, controller 76 processes the data or message transmission by routing the data or message to encoder 72. Controller 76 can be implemented in a microcontroller, a microprocessor, a digital signal processing (DSP) chip, or an ASIC programmed to perform the function as described herein.

In the exemplary embodiment, encoder 72 encodes the message consistent with the Blank and Burst signaling data format described in the aforementioned U.S. Pat. No. 5,504,773. Encoder 72 then generates and appends a set of CRC bits, appends a set of code tail bits, encodes the data and appended bits, and reorders the symbols within the encoded data. The interleaved data is provided to modulator (MOD) 74.

Modulator 74 can be implemented in many embodiments. In the exemplary embodiment (see FIG. 6), the interleaved data is covered with Walsh codes, spread with a long PN code, and further spread with the short PN codes. The spread data is provided to a transmitter within front end 62. The transmitter modulates, filters, amplifies, and transmits the reverse link signal over the air, through antenna 46, on reverse link 52.

In the exemplary embodiment, mobile station 6 spreads the reverse link data in accordance with a long PN code. Each reverse link channel is defined in accordance with the temporal offset of a common long PN sequence. At two differing offsets the resulting modulation sequences are uncorrelated. The offset of a mobile station 6 is determined in accordance with a unique numerical identification of mobile station 6, which in the exemplary embodiment of the IS-95 mobile stations 6 is the mobile station specific identification number. Thus, each mobile station 6 transmits on one uncorrelated reverse link channel determined in accordance with its unique electronic serial number.

At base station 4, the reverse link signal is received by antenna 46 and provided to RF unit 44. RF unit 44 filters, amplifies, demodulates, and quantizes the signal and provides the digitized signal to channel element 42. Channel element 42 despreads the digitized signal with the short PN codes and the long PN code. Channel element 42 also performs the Walsh code decovering and pilot and DRC extraction. Channel element 42 then reorders the demodulated data, decodes the de-interleaved data, and performs the CRC check function. The decoded data, e.g., the data or message, is provided to selector element 14. Selector element 14 routes the data and message to the appropriate destination. Channel element 42 may also forward a quality indicator to selector element 14 indicative of the condition of the received data packet.

Figure 9:
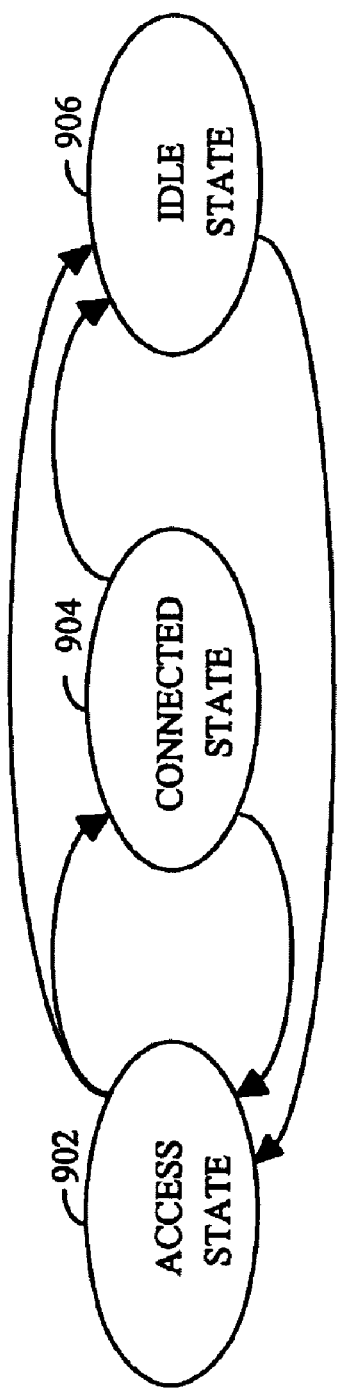
FIG. 9 is an exemplary state diagram showing the transitions between the various operating states of the mobile station.

In the exemplary embodiment, mobile station 6 can be in one of three operating states. An exemplary state diagram showing the transitions between the various operating states of mobile station 6 is shown in FIG. 9. In the access state 902, mobile station 6 sends access probes and waits for channel assignment by base station 4. The channel assignment comprises allocation of resources, such as a power control channel and frequency allocation. Mobile station 6 can transition from the access state 902 to the connected state 904 if mobile station 6 is paged and alerted to an upcoming data transmission, or if mobile station 6 transmits data on the reverse link. In the connected state 904, mobile station 6 exchanges (e.g., transmits or receives) data and performs handoff operations. Upon completion of a release procedure, mobile station 6 transitions from the connected state 904 to the idle state 906. Mobile station 6 can also transition from the access state 902 to the idle state 906 upon being rejected of a connection with base station 4. In the idle state 906, mobile station 6 listens to overhead and paging messages by receiving and decoding messages on the forward control channel and performs idle handoff procedure. Mobile station 6 can transition to the access state 902 by initiating the procedure. The state diagram shown in FIG. 9 is only an exemplary state definition, which is shown for illustration. Other state diagrams can also be utilized and are within the scope of the present invention.

II. Forward Link Data Transmission

In the exemplary embodiment, the initiation of a communication between mobile station 6 and base station 4 occurs in a similar manner as that for the CDMA system. After completion of the call set up, mobile station 6 monitors the control channel for paging messages. While in the connected state, mobile station 6 begins transmission of the pilot signal on the reverse link.

Figure 5:
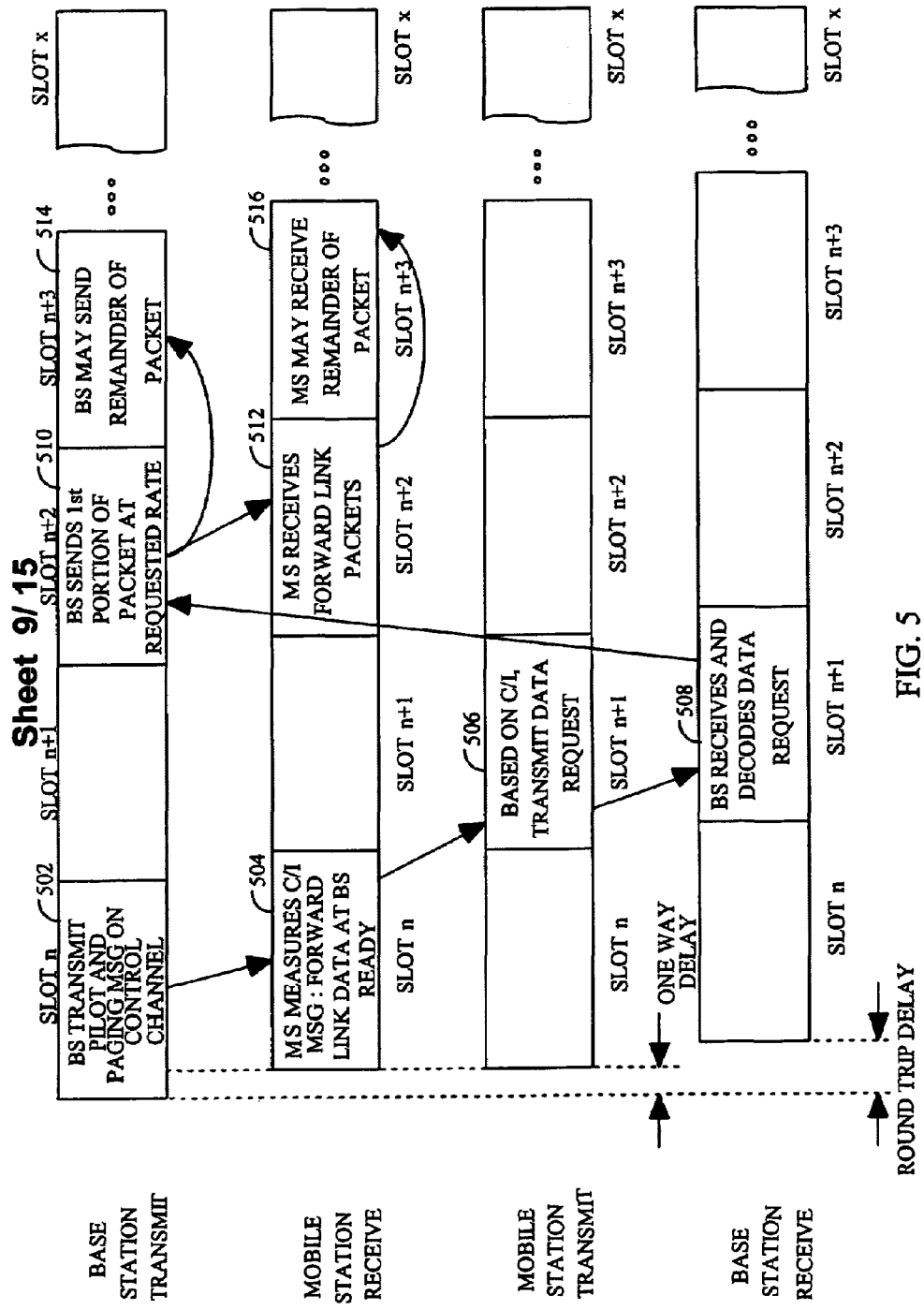
FIG. 5 is an exemplary timing diagram showing the high rate packet transmission on the forward link.

An exemplary flow diagram of the forward link high rate data transmission of the present invention is shown in FIG. 5. If base station 4 has data to transmit to mobile station 6, base station 4 sends a paging message addressed to mobile station 6 on the control channel at block 502. The paging message can be sent from one or multiple base stations 4, depending on the handoff state of mobile station 6. Upon reception of the paging message, mobile station 6 begins the C/I measurement process at block 504. The C/I of the forward link signal is calculated from one or a combination of methods described below. Mobile station 6 then selects a requested data rate based on the best C/I measurement and transmits a DRC message on the DRC channel at block 506.

Within the same time slot, base station 4 receives the DRC message at block 508. If the next time slot is available for data transmission, base station 4 transmits data to mobile station 6 at the requested data rate at block 510. Mobile station 6 receives the data transmission at block 512. If the next time slot is available, base station 4 transmits the remainder of the packet at block 514 and mobile station 6 receives the data transmission at block 516.

In the present invention, mobile station 6 can be in communication with one or more base stations 4 simultaneously. The actions taken by mobile station 6 depend on whether mobile station 6 is or is not in soft handoff. These two cases are discussed separately below.

III. No Handoff Case

In the no handoff case, mobile station 6 communicates with one base station 4. Referring to FIG. 2, the data destined for a particular mobile station 6 is provided to selector element 14 which has been assigned to control the communication with that mobile station 6. Selector element 14 forwards the data to data queue 40 within base station 4. Base station 4 queues the data and transmits a paging message on the control channel. Base station 4 then monitors the reverse link DRC channel for DRC messages from mobile station 6. If no signal is detected on the DRC channel, base station 4 can retransmit the paging message until the DRC message is detected. After a predetermined number of retransmission attempts, base station 4 can terminate the process or re-initiate a call with mobile station 6.

In the exemplary embodiment, mobile station 6 transmits the requested data rate, in the form of a DRC message, to base station 4 on the DRC channel. In the alternative embodiment, mobile station 6 transmits an indication of the quality of the forward link channel (e.g., the C/I measurement) to base station 4. In the exemplary embodiment, the 3-bit DRC message is decoded with soft decisions by base station 4. In the exemplary embodiment, the DRC message is transmitted within the first half of each time slot. Base station 4 then has the remaining half of the time slot to decode the DRC message and configure the hardware for data transmission at the next successive time slot, if that time slot is available for data transmission to this mobile station 6. If the next successive time slot is not available, base station 4 waits for the next available time slot and continues to monitor the DRC channel for the new DRC messages.

In the first embodiment, base station 4 transmits at the requested data rate. This embodiment confers to mobile station 6 the important decision of selecting the data rate. Always transmitting at the requested data rate has the advantage that mobile station 6 knows which data rate to expect. Thus, mobile station 6 only demodulates and decodes the traffic channel in accordance with the requested data rate. Base station 4 does not have to transmit a message to mobile station 6 indicating which data rate is being used by base station 4.

In the first embodiment, after reception of the paging message, mobile station 6 continuously attempts to demodulate the data at the requested data rate. Mobile station 6 demodulates the forward traffic channel and provides the soft decision symbols to the decoder. The decoder decodes the symbols and performs the frame check on the decoded packet to determine whether the packet was received correctly. If the packet was received in error or if the packet was directed for another mobile station 6, the frame check would indicate a packet error. Alternatively in the first embodiment, mobile station 6 demodulates the data on a slot-by-slot basis. In the exemplary embodiment, mobile station 6 is able to determine whether a data transmission is directed for it based on a preamble which is incorporated within each transmitted data packet, as described below. Thus, mobile station 6 can terminate the decoding process if it is determined that the transmission is directed for another mobile station 6. In either case, mobile station 6 transmits a negative acknowledgment (NACK) message to base station 4 to acknowledge the incorrect reception of the data units. Upon receipt of the NACK message, the data units received in error is retransmitted.

The transmission of the NACK messages can be implemented in a manner similar to the transmission of the error indicator bit (EIB) in the CDMA system. The implementation and use of EIB transmission are disclosed in U.S. Pat. No. 5,568,483, entitled "METHOD AND APPARATUS FOR THE FORMATTING OF DATA FOR TRANSMISSION", assigned to the assignee of the present invention and incorporated by reference herein. Alternatively, NACK can be transmitted with messages.

In the second embodiment, the data rate is determined by base station 4 with input from mobile station 6. Mobile station 6 performs the C/I measurement and transmits an indication of the link quality (e.g., the C/I measurement) to base station 4. Base station 4 can adjust the requested data rate based on the resources available to base station 4, such as the queue size and the available transmit power. The adjusted data rate can be transmitted to mobile station 6 prior to or concurrent with data transmission at the adjusted data rate, or can be implied in the encoding of the data packets. In the first case, wherein mobile station 6 receives the adjusted data rate before the data transmission, mobile station 6 demodulates and decodes the received packet in the manner described in the first embodiment. In the second case, wherein the adjusted data rate is transmitted to mobile station 6 concurrent with the data transmission, mobile station 6 can demodulate the forward traffic channel and store the demodulated data. Upon receipt of the adjusted data rate, mobile station 6 decodes the data in accordance with the adjusted data rate. And in the third case, wherein the adjusted data rate is implied in the encoded data packets, mobile station 6 demodulates and decodes all candidate rates and determine a posteriori the transmit rate for selection of the decoded data. The method and apparatus for performing rate determination are described in detail in U.S. patent application Ser. No. 08/730,863, entitled "METHOD AND APPARATUS FOR DETERMINING THE RATE OF RECEIVED DATA IN A VARIABLE RATE COMMUNICATION SYSTEM", filed Oct. 18, 1996, now U.S. Pat. No. 5,751,725, issued May 12, 1998, by Tao Chen, and patent U.S. application Ser. No. 08/908,866, also entitled "METHOD AND APPARATUS FOR DETERMINING THE RATE OF RECEIVED DATA IN A VARIABLE RATE COMMUNICATION SYSTEM", filed Aug. 17, 1999, now U.S. Pat. No. 6,175,590, issued Jan. 16, 2001, by Jeremy M. Stein, both assigned to the assignee of the present invention and incorporated by reference herein. For all cases described above, mobile station 6 transmits a NACK message as described above if the outcome of the frame check is negative.

The discussion hereinafter is based on the first embodiment wherein mobile station 6 transmits to base station 4 the DRC message indicative of the requested data rate, except as otherwise indicated. However, the inventive concept described herein is equally applicable to the second embodiment wherein mobile station 6 transmits an indication of the link quality to base station 4.

IV. Handoff Case

In the handoff case, mobile station 6 communicates with multiple base stations 4 on the reverse link. In the exemplary embodiment, data transmission on the forward link to a particular mobile station 6 occurs from one base station 4. However, mobile station 6 can simultaneously receive the pilot signals from multiple base stations 4. If the C/I measurement of a base station 4 is above a predetermined threshold, the base station 4 is added to the active set of mobile station 6. During the soft handoff direction message, the new base station 4 assigns mobile station 6 to a reverse power control (RPC) Walsh channel which is described below. Each base station 4 in soft handoff with mobile station 6 monitors the reverse link transmission and sends an RPC bit on their respective RPC Walsh channels.

Referring to FIG. 2, selector element 14 assigned to control the communication with mobile station 6 forwards the data to all base stations 4 in the active set of mobile station 6. All base stations 4 which receive data from selector element 14 transmit a paging message to mobile station 6 on their respective control channels. When mobile station 6 is in the connected state, mobile station 6 performs two functions. First, mobile station 6 selects the best base station 4 based on a set of parameter which can be the best C/I measurement. Mobile station 6 then selects a data rate corresponding to the C/I measurement and transmits a DRC message to the selected base station 4. Mobile station 6 can direct transmission of the DRC message to a particular base station 4 by covering the DRC message with the Walsh cover assigned to that particular base station 4. Second, mobile station 6 attempts to demodulate the forward link signal in accordance with the requested data rate at each subsequent time slot.

After transmitting the paging messages, all base stations 4 in the active set monitor the DRC channel for a DRC message from mobile station 6. Again, because the DRC message is covered with a Walsh code, the selected base station 4 assigned with the identical Walsh cover is able to decover the DRC message. Upon receipt of the DRC message, the selected base station 4 transmits data to mobile station 6 at the next available time slots.

In the exemplary embodiment, base station 4 transmits data in packets comprising a plurality of data units at the requested data rate to mobile station 6. If the data units are incorrectly received by mobile station 6, a NACK message is transmitted on the reverse links to all base stations 4 in the active set. In the exemplary embodiment, the NACK message is demodulated and decoded by base stations 4 and forwarded to selector element 14 for processing. Upon processing of the NACK message, the data units are retransmitted using the procedure as described above. In the exemplary embodiment, selector element 14 combines the NACK signals received from all base stations 4 into one NACK message and sends the NACK message to all base stations 4 in the active set.

In the exemplary embodiment, mobile station 6 can detect changes in the best C/I measurement and dynamically request data transmissions from different base stations 4 at each time slot to improve efficiency. In the exemplary embodiment, since data transmission occurs from only one base station 4 at any given time slot, other base stations 4 in the active set may not be aware which data units, if any, has been transmitted to mobile station 6. In the exemplary embodiment, the transmitting base station 4 informs selector element 14 of the data transmission. Selector element 14 then sends a message to all base stations 4 in the active set. In the exemplary embodiment, the transmitted data is presumed to have been correctly received by mobile station 6. Therefore, if mobile station 6 requests data transmission from a different base station 4 in the active set, the new base station 4 transmits the remaining data units. In the exemplary embodiment, the new base station 4 transmits in accordance with the last transmission update from selector element 14. Alternatively, the new base station 4 selects the next data units to transmit using predictive schemes based on metrics such as the average transmission rate and prior updates from selector element 14. These mechanisms minimize duplicative retransmissions of the same data units by multiple base stations 4 at different time slots which result in a loss in efficiency. If a prior transmission was received in error, base stations 4 can retransmit those data units out of sequence since each data unit is identified by a unique sequence number as described below. In the exemplary embodiment, if a hole (or non-transmitted data units) is created (e.g., as the result of handoff between one base station 4 to another base station 4), the missing data units are considered as though received in error. Mobile station 6 transmits NACK messages corresponding to the missing data units and these data units are retransmitted.

In the exemplary embodiment, each base station 4 in the active set maintains an independent data queue 40 which contains the data to be transmitted to mobile station 6. The selected base station 4 transmits data existing in its data queue 40 in a sequential order, except for retransmissions of data units received in error and signaling messages. In the exemplary embodiment, the transmitted data units are deleted from queue 40 after transmission.

V. Other Considerations for Forward Link Data Transmissions

An important consideration in the data communication system of the present invention is the accuracy of the C/I estimates for the purpose of selecting the data rate for future transmissions. In the exemplary embodiment, the C/I measurements are performed on the pilot signals during the time interval when base stations 4 transmit pilot signals. In the exemplary embodiment, since only the pilot signals are transmitted during this pilot time interval, the effects of multipath and interference are minimal.

In other implementations of the present invention wherein the pilot signals are transmitted continuously over an orthogonal code channel, similar to that for the IS-95 systems, the effect of multipath and interference can distort the C/I measurements. Similarly, when performing the C/I measurement on the data transmissions instead of the pilot signals, multipath and interference can also degrade the C/I measurements. In both of these cases, when one base station 4 is transmitting to one mobile station 6, the mobile station 6 is able to accurately measure the C/I of the forward link signal because no other interfering signals are present. However, when mobile station 6 is in soft handoff and receives the pilot signals from multiple base stations 4, mobile station 6 is not able to discern whether or not base stations 4 were transmitting data. In the worst case scenario, mobile station 6 can measure a high C/I at a first time slot, when no base stations 4 were transmitting data to any mobile station 6, and receive data transmission at a second time slot, when all base stations 4 are transmitting data at the same time slot. The C/I measurement at the first time slot, when all base stations 4 are idle, gives a false indication of the forward link signal quality at the second time slot since the status of the data communication system has changed. In fact, the actual C/I at the second time slot can be degraded to the point that reliable decoding at the requested data rate is not possible.

The converse extreme scenario exists when a C/I estimate by mobile station 6 is based on maximal interference. However, the actual transmission occurs when only the selected base station is transmitting. In this case, the C/I estimate and selected data rate are conservative and the transmission occurs at a rate lower than that which could be reliably decoded, thus reducing the transmission efficiency.

In the implementation wherein the C/I measurement is performed on a continuous pilot signal or the traffic signal, the prediction of the C/I at the second time slot based on the measurement of the C/I at the first time slot can be made more accurate by three embodiments. In the first embodiment, data transmissions from base stations 4 are controlled so that base stations 4 do not constantly toggle between the transmit and idle states at successive time slots. This can be achieved by queuing enough data (e.g., a predetermined number of information bits) before actual data transmission to mobile stations 6.

In the second embodiment, each base station 4 transmits a forward activity bit (hereinafter referred to as the FAC bit) which indicates whether a transmission will occur at the next half frame. The use of the FAC bit is described in detail below. Mobile station 6 performs the C/I measurement taking into account the received FAC bit from each base station 4.

In the third embodiment, which corresponds to the scheme wherein an indication of the link quality is transmitted to base station 4 and which uses a centralized scheduling scheme, the scheduling information indicating which ones of base stations 4 transmitted data at each time slot is made available to channel scheduler 48. Channel scheduler 48 receives the C/I measurements from mobile stations 6 and can adjust the C/I measurements based on its knowledge of the presence or absence of data transmission from each base station 4 in the data communication system.

For example, mobile station 6 can measure the C/I at the first time slot when no adjacent base stations 4 are transmitting. The measured C/I is provided to channel scheduler 48. Channel scheduler 48 knows that no adjacent base stations 4 transmitted data in the first time slot since none was scheduled by channel scheduler 48. In scheduling data transmission at the second time slot, channel scheduler 48 knows whether one or more adjacent base stations 4 will transmit data. Channel scheduler 48 can adjust the C/I measured at the first time slot to take into account the additional interference mobile station 6 will receive in the second time slot due to data transmissions by adjacent base stations 4. Alternately, if the C/I is measured at the first time slot when adjacent base stations 4 are transmitting and these adjacent base stations 4 are not transmitting at the second time slot, channel scheduler 48 can adjust the C/I measurement to take into account the additional information.

Another important consideration is to minimize redundant retransmissions. Redundant retransmissions can result from allowing mobile station 6 to select data transmission from different base stations 4 at successive time slots. The best C/I measurement can toggle between two or more base stations 4 over successive time slots if mobile station 6 measures approximately equal C/I for these base stations 4. The toggling can be due to deviations in the C/I measurements and/or changes in the channel condition. Data transmission by different base stations 4 at successive time slots can result in a loss in efficiency.

The toggling problem can be addressed by the use of hysteresis. The hysteresis can be implemented with a signal level scheme, a timing scheme, or a combination of the signal level and timing schemes. In the exemplary signal level scheme, the better C/I measurement of a different base station 4 in the active set is not selected unless it exceeds the C/I measurement of the current transmitting base station 4 by at least the hysteresis quantity. As an example, assume that the hysteresis is 1.0 dB and that the C/I measurement of the first base station 4 is 3.5 dB and the C/I measurement of the second base station 4 is 3.0 dB at the first time slot. At the next time slot, the second base station 4 is not selected unless its C/I measurement is at least 1.0 dB higher than that of the first base station 4. Thus, if the C/I measurement of the first base station 4 is still 3.5 dB at the next time slot, the second base station 4 is not selected unless its C/I measurement is at least 4.5 dB.

In the exemplary timing scheme, base station 4 transmits data packets to mobile station 6 for a predetermined number of time slots. Mobile station 6 is not allowed to select a different transmitting base station 4 within the predetermined number of time slots. Mobile station 6 continues to measure the C/I of the current transmitting base station 4 at each time slot and selects the data rate in response to the C/I measurement.

Yet another important consideration is the efficiency of the data transmission. Referring to FIGS. 4E and 4F, each data packet format 410 and 430 contains data and overhead bits. In the exemplary embodiment, the number of overhead bits is fixed for all data rates. At the highest data rate, the percentage of overhead is small relative to the packet size and the efficiency is high. At the lower data rates, the overhead bits can comprise a larger percentage of the packet. The inefficiency at the lower data rates can be improved by transmitting variable length data packets to mobile station 6. The variable length data packets can be partitioned and transmitted to mobile station 6 over multiple time slots. Preferably, the variable length data packets are transmitted to mobile station 6 over successive time slots to simplify the processing. The present invention is directed to the use of various packet sizes for various supported data rates to improve the overall transmission efficiency.

VI. Forward Link Architecture

In the exemplary embodiment, base station 4 transmits at the maximum power available to base station 4 and at the maximum data rate supported by the data communication system to a single mobile station 6 at any given slot. The maximum data rate that can be supported is dynamic and depends on the C/I of the forward link signal as measured by mobile station 6. Preferably, base station 4 transmits to only one mobile station 6 at any given time slot.

To facilitate data transmission, the forward link comprises four time multiplexed channels: the pilot channel, power control channel, control channel, and traffic channel. The function and implementation of each of these channels are described below. In the exemplary embodiment, the traffic and power control channels each comprises a number of orthogonally spread Walsh channels. In the present invention, the traffic channel is used to transmit traffic data and paging messages to mobile stations 6. When used to transmit paging messages, the traffic channel is also referred to as the control channel in this specification.

In the exemplary embodiment, the bandwidth of the forward link is selected to be 1.2288 MHz. This bandwidth selection allows the use of existing hardware components designed for a CDMA system which conforms to the IS-95 standard. However, the data communication system of the present invention can be adopted for use with different bandwidths to improve capacity and/or to conform to system requirements. For example, a 5 MHz bandwidth can be utilized to increase the capacity. Furthermore, the bandwidths of the forward link and the reverse link can be different (e.g., 5 MHz bandwidth on the forward link and 1.2288 MHz bandwidth on the reverse link) to more closely match link capacity with demand.

In the exemplary embodiment, the short $PN_I$ and $PN_Q$ codes are the same length $2^{15}$ PN codes which are specified by the IS-95 standard. At the 1.2288 MHz chip rate, the short PN sequences repeat every 26.67 msec $\{26.67 \text{ msec}=2^{15}/1.2288 \times 10^6\}$. In the exemplary embodiment, the same short PN codes are used by all base stations 4 within the data communication system. However, each base station 4 is identified by a unique offset of the basic short PN sequences. In the exemplary embodiment, the offset is in increments of 64 chips. Other bandwidth and PN codes can be utilized and are within the scope of the present invention.

VI. Forward Link Traffic Channel

Figure 3A:
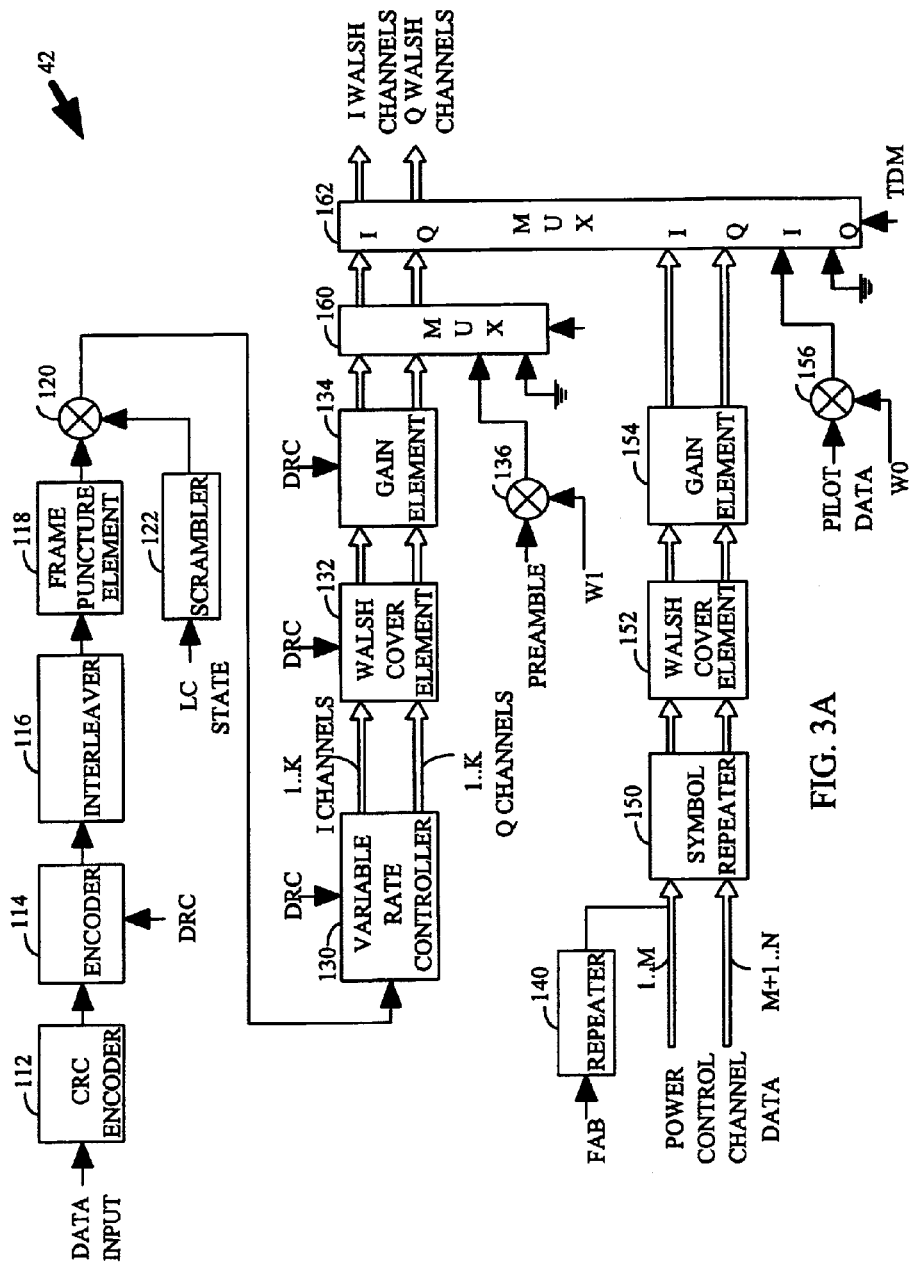
FIGS. 3A–3B are block diagrams of the exemplary forward link architecture of the present invention.

A block diagram of the exemplary forward link architecture of the present invention is shown in FIG. 3A. The data is partitioned into data packets and provided to CRC encoder 112. For each data packet, CRC encoder 112 generates frame check bits (e.g., the CRC parity bits) and inserts the code tail bits. The formatted packet from CRC encoder 112 comprises the data, the frame check and code tail bits, and other overhead bits, which are described below. The formatted packet is provided to encoder 114, which, in the exemplary embodiment, encodes the packet in accordance with the encoding format disclosed in the aforementioned U.S. Pat.

No. 5,933,462. Other encoding formats can also be used and are within the scope of the present invention. The encoded packet from encoder 114 is provided to interleaver 116, which reorders the code symbols in the packet. The interleaved packet is provided to frame puncture element 118, which removes a fraction of the packet in the manner described below. The punctured packet is provided to multiplier 120, which scrambles the data with the scrambling sequence from scrambler 122. Puncture element 118 and scrambler 122 are described in detail below. The output from multiplier 120 comprises the scrambled packet.

The scrambled packet is provided to variable rate controller 130, which demultiplexes the packet into K parallel inphase and quadrature channels, where K is dependent on the data rate. In the exemplary embodiment, the scrambled packet is first demultiplexed into the inphase (I) and quadrature (Q) streams. In the exemplary embodiment, the I stream comprises even indexed symbols and the Q stream comprises odd indexed symbol. Each stream is further demultiplexed into K parallel channels such that the symbol rate of each channel is fixed for all data rates. The K channels of each stream are provided to Walsh cover element 132, which covers each channel with a Walsh function to provide orthogonal channels. The orthogonal channel data are provided to gain element 134, which scales the data to maintain a constant total-energy-per-chip (and hence constant output power) for all data rates. The scaled data from gain element 134 is provided to multiplexer (MIUX) 160, which multiplexes the data with the preamble. The preamble is discussed in detail below. The output from MUX 160 is provided to multiplexer (MUX) 162, which multiplexes the traffic data, the power control bits, and the pilot data. The output of MUX 162 comprises the I Walsh channels and the Q Walsh channels.

Figure 3B:
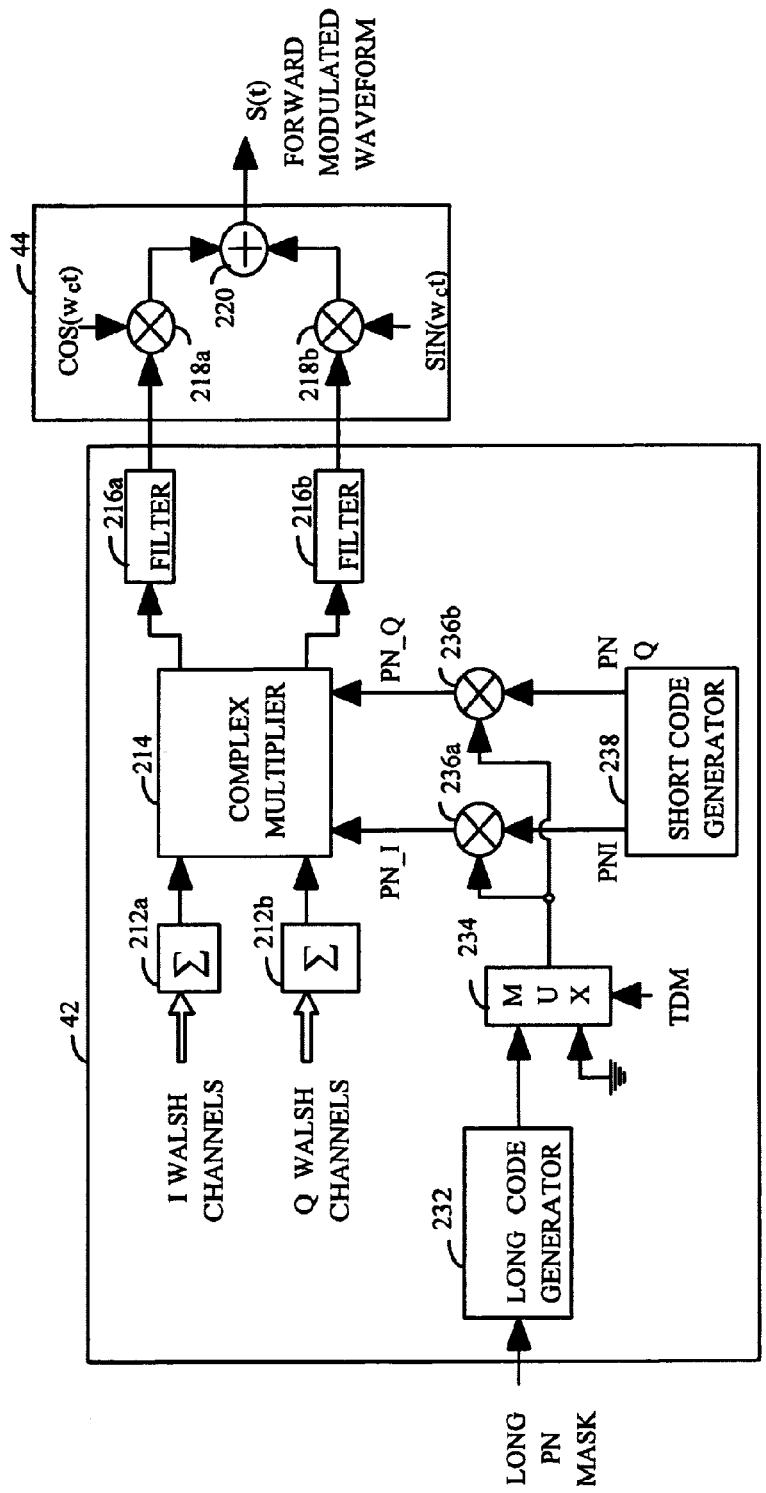

A block diagram of the exemplary modulator used to modulate the data is illustrated in FIG. 3B. The I Walsh channels and Q Walsh channels are provided to summers 212a and 212b, respectively, which sum the K Walsh channels to provide the signals $I_{sum}$ and $Q_{sum}$, respectively. The $I_{sum}$ and $Q_{sum}$ signals are provided to complex multiplier 214. Complex multiplier 214 also receives the PN_I and PN_Q signals from multipliers 236a and 236b, respectively, and multiplies the two complex inputs in accordance with the following equation:

$$(I_{mult}+jQ_{mult})=(I_{sum}+jQ_{sum})\cdot(PN\_I+jPN\_Q)= \\ (I_{sum}\cdot PN\_I-Q_{sum}\cdot PN\_Q)+j(I_{sum}\cdot PN\_Q+ \\ Q_{sum}\cdot PN\_I), \quad (2)$$

where $I_{mult}$ and $Q_{mult}$ are the outputs from complex multiplier 214 and j is the complex representation. The $I_{mult}$ and $Q_{mult}$ signals are provided to filters 216a and 216b, respectively, which filters the signals. The filtered signals from filters 216a and 216b are provided to multipliers 218a and 218b, respectively, which multiplies the signals with the in-phase sinusoid $COS(w_c t)$ and the quadrature sinusoid $SIN(w_c t)$, respectively. The I modulated and Q modulated signals are provided to summer 220 which sums the signals to provide the forward modulated waveform S(t).

In the exemplary embodiment, the data packet is spread with the long PN code and the short PN codes. The long PN code scrambles the packet such that only the mobile station 6 for which the packet is destined is able to descramble the packet. In the exemplary embodiment, the pilot and power control bits and the control channel packet are spread with the short PN codes but not the long PN code to allow all mobile stations 6 to receive these bits. The long PN sequence is generated by long code generator 232 and provided to multiplexer (MUX) 234. The long PN mask determines the offset of the long PN sequence and is uniquely assigned to the destination mobile station 6. The output from MUX 234 is the long PN sequence during the data portion of the transmission and zero otherwise (e.g. during the pilot and power control portion). The gated long PN sequence from MUX 234 and the short $PN_I$ and $PN_Q$ sequences from short code generator 238 are provided to multipliers 236a and 236b, respectively, which multiply the two sets of sequences to form the PN_I and PN_Q signals, respectively. The PN_I and PN_Q signals are provided to complex multiplier 214.

The block diagram of the exemplary traffic channel shown in FIGS. 3A and 3B is one of numerous architectures, which support data encoding and modulation on the forward link. Other architectures, such as the architecture for the forward link traffic channel in the CDMA system, which conforms to the IS-95 standard, can also be utilized and are within the scope of the present invention.

In the exemplary embodiment, the data rates supported by base stations 4 are predetermined and each supported data rate is assigned a unique rate index. Mobile station 6 selects one of the supported data rates based on the C/I measurement. Since the requested data rate needs to be sent to a base station 4 to direct that base station 4 to transmit data at the requested data rate, a trade off is made between the number of supported data rates and the number of bits needed to identify the requested data rate. In the exemplary embodiment, the number of supported data rates is seven and a 3-bit rate index is used to identify the requested data rate. An exemplary definition of the supported data rates is illustrated in Table 1. Different definition of the supported data rates can be contemplated and are within the scope of the present invention.

In the exemplary embodiment, the minimum data rate is 38.4 Kbps and the maximum data rate is 2.4576 Mbps. The minimum data rate is selected based on the worse case C/I measurement in the system, the processing gain of the system, the design of the error correcting codes, and the desired level of performance. In the exemplary embodiment, the supported data rates are chosen such that the difference between successive supported data rates is 3 dB. The 3 dB increment is a compromise among several factors which include the accuracy of the C/I measurement that can be achieved by mobile station 6, the losses (or inefficiencies) which results from the quantization of the data rates based on the C/I measurement, and the number of bits (or the bit rate) needed to transmit the requested data rate from mobile station 6 to base station 4. More supported data rates requires more bits to identify the requested data rate but allows for more efficient use of the forward link because of smaller quantization error between the calculated maximum data rate and the supported data rate. The present invention is directed to the use of any number of supported data rates and other data rates than those listed in Table 1.

TABLE 1

Traffic Channel Parameters

| Parameter | Data Rates | | | | | | | Units |
|---|---|---|---|---|---|---|---|---|
| | 38.4 | 76.8 | 153.6 | 307.2 | 614.4 | 1228.8 | 2457.6 | Kbps |
| Data bit/packet | 1024 | 1024 | 1024 | 1024 | 1024 | 2048 | 2048 | bits |
| Packet length | 26.67 | 13.33 | 6.67 | 3.33 | 1.67 | 1.67 | 0.83 | msec |
| Slots/packet | 16 | 8 | 4 | 2 | 1 | 1 | 0.5 | slots |
| Packet/transmission | 1 | 1 | 1 | 1 | 1 | 1 | 2 | packets |
| Slots/transmission | 16 | 8 | 4 | 2 | 1 | 1 | 1 | slots |
| Walsh symbol rate | 153.6 | 307.2 | 614.4 | 1228.8 | 2457.6 | 2457.6 | 4915.2 | Ksps |
| Walsh channel/ QPSK phase | 1 | 2 | 4 | 8 | 16 | 16 | 16 | channels |
| Modulator rate | 76.8 | 76.8 | 76.8 | 76.8 | 76.8 | 76.8 | 76.8[1] | ksps |
| PN chips/data bit | 32 | 16 | 8 | 4 | 2 | 1 | 0.5 | chips/bit |
| PN chip rate | 1228.8 | 1228.8 | 1228.8 | 1228.8 | 1228.8 | 1228.8 | 1228.8 | Kcps |
| Modulation format | QPSK | QPSK | QPSK | QPSK | QPSK | QPSK | QAM[1] | |
| Rate index | 0 | 1 | 2 | 3 | 4 | 5 | 6 | |

Note:
[1] 16-QAM modulation

Figure 4A:
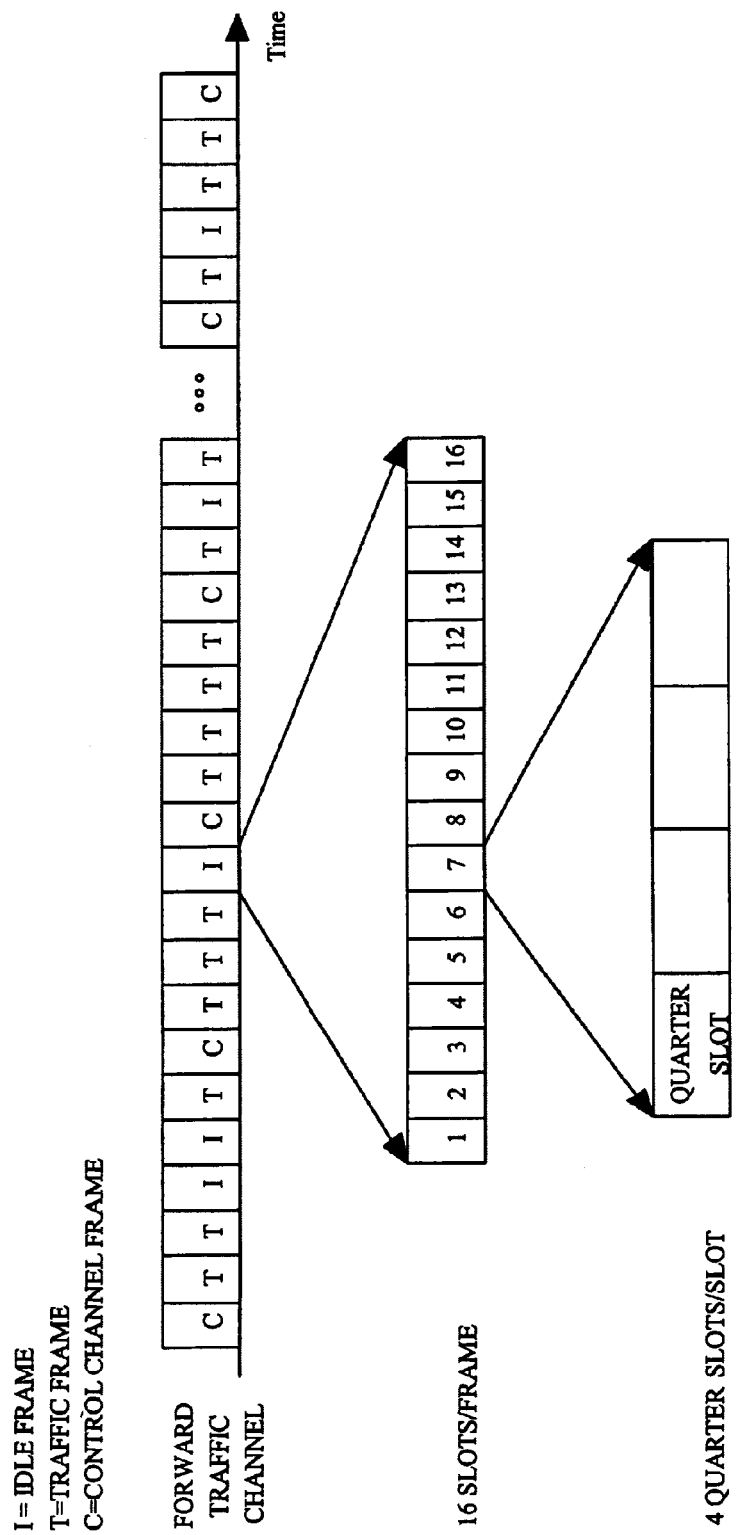
FIG. 4A is a diagram of the exemplary forward link frame structure of the present invention.

A diagram of the exemplary forward link frame structure of the present invention is illustrated in FIG. 4A. The traffic channel transmission is partitioned into frames which, in the exemplary embodiment, are defined as the length of the short PN sequences or 26.67 msec. Each frame can carry control channel information addressed to all mobile stations 6 (control channel frame), traffic data addressed to a particular mobile station 6 (traffic frame), or can be empty (idle frame). The content of each frame is determined by the scheduling performed by the transmitting base station 4. In the exemplary embodiment, each frame comprises 16 time slots, with each time slot having a duration of 1.667 msec. A time slot of 1.667 msec is adequate to enable mobile station 6 to perform the C/I measurement of the forward link signal. A time slot of 1.667 msec also represents a sufficient amount of time for efficient packet data transmission. In the exemplary embodiment, each time slot is further partitioned into four-quarter slots.

In the present invention, each data packet is transmitted over one or more time slots as shown in Table 1. In the exemplary embodiment, each forward link data packet comprises 1024 or 2048 bits. Thus, the number of time slots required to transmit each data packet is dependent on the data rate and ranges from 16 time slots for the 38.4 Kbps rate to 1 time slot for the 1.2288 Mbps rate and higher.

Figure 4B:
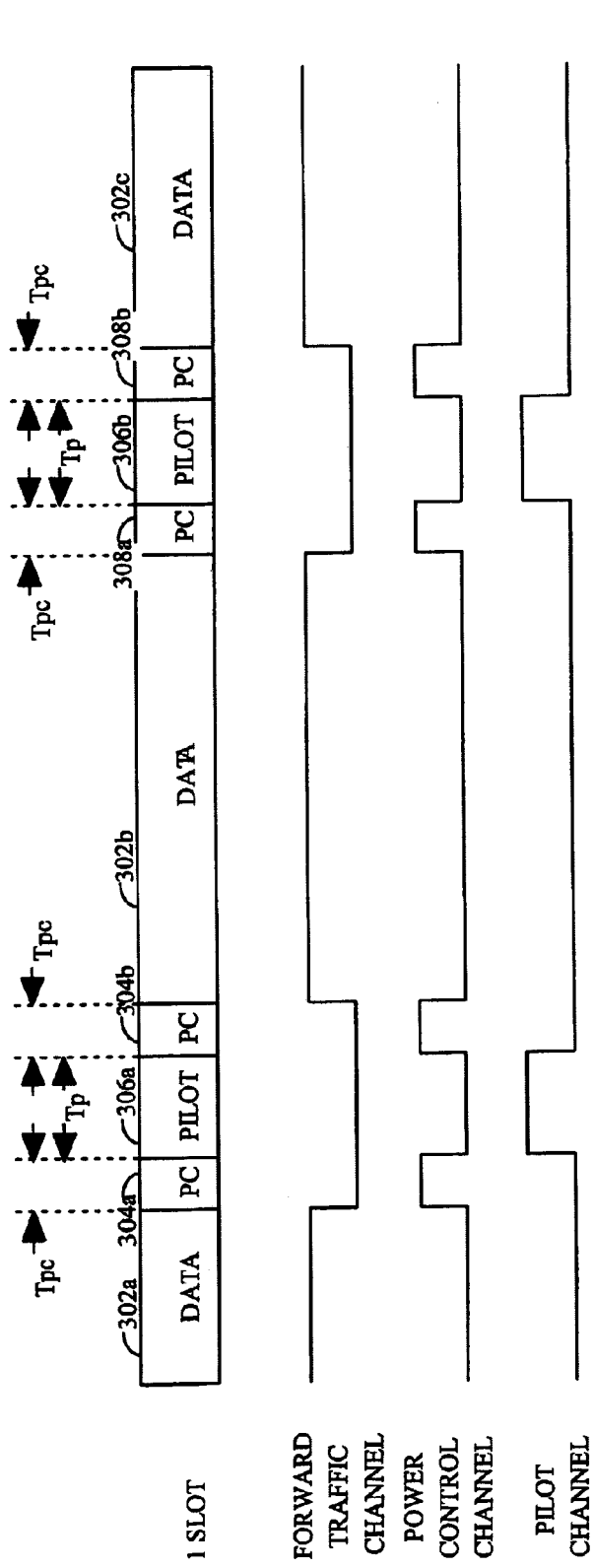
FIGS. 4B–4C are diagrams of the exemplary forward traffic channel and power control channel, respectively.

An exemplary diagram of the forward link slot structure of the present invention is shown in FIG. 4B. In the exemplary embodiment, each slot comprises three of the four time multiplexed channels, the traffic channel, the control channel, the pilot channel, and the power control channel. In the exemplary embodiment, the pilot and power control channels are transmitted in two pilot and power control bursts, which are located at the same positions in each time slot. The pilot and power control bursts are described in detail below.

In the exemplary embodiment, the interleaved packet from interleaver 116 is punctured to accommodate the pilot and power control bursts. In the exemplary embodiment, each interleaved packet comprises 4096 code symbols and the first 512 code symbols are punctured, as shown in FIG. 4D. The remaining code symbols are skewed in time to align to the traffic channel transmission intervals.

The punctured code symbols are scrambled to randomize the data prior to applying the orthogonal Walsh cover. The randomization limits the peak-to-average envelope on the modulated waveform S(t). The scrambling sequence can be generated with a linear feedback shift register, in a manner known in the art. In the exemplary embodiment, scrambler 122 is loaded with the LC state at the start of each slot. In the exemplary embodiment, the clock of scrambler 122 is synchronous with the clock of interleaver 116 but is stalled during the pilot and power control bursts.

In the exemplary embodiment, the forward Walsh channels (for the traffic channel and power control channel) are orthogonally spread with 16-bit Walsh covers at the fixed chip rate of 1.2288 Mcps. The number of parallel orthogonal channels K per in-phase and quadrature signal is a function of the data rate, as shown in Table 1. In the exemplary embodiment, for lower data rates, the in-phase and quadrature Walsh covers are chosen to be orthogonal sets to minimize cross-talk to the demodulator phase estimate errors. For example, for 16 Walsh channels, an exemplary Walsh assignment is $W_0$ through $W_7$ for the in-phase signal and $W_8$ through $W_{15}$ for the quadrature signal.

In the exemplary embodiment, QPSK modulation is used for data rates of 1.2288 Mbps and lower. For QPSK modulation, each Walsh channel comprises one bit. In the exemplary embodiment, at the highest data rate of 2.4576 Mbps, 16-QAM is used and the scrambled data is demultiplexed into 32 parallel streams which are each 2-bit wide, 16 parallel streams for the inphase signal and 16 parallel streams for the quadrature signal. In the exemplary embodiment, the LSB of each 2-bit symbol is the earlier symbol output from interleaver 116. In the exemplary embodiment, the QAM modulation inputs of (0, 1, 3, 2) map to modulation values of (+3, +1, −1, −3), respectively. The use of other modulation schemes, such as m-ary phase shift keying PSK, can be contemplated and are within the scope of the present invention.

The in-phase and quadrature Walsh channels are scaled prior to modulation to maintain a constant total transmit power which is independent of the data rate. The gain settings are normalized to a unity reference equivalent to unmodulated BPSK. The normalized channel gains G as a function of the number of Walsh channels (or data rate) are shown in Table 2. Also listed in Table 2 is the average power per Walsh channel (inphase or quadrature) such that the total normalized power is equal to unity. Note that the channel gain for 16-QAM accounts for the fact that the normalized energy per Walsh chip is 1 for QPSK and 5 for 16-QAM.

TABLE 2

Traffic Channel Orthogonal Channel Gains

| Data Rate (Kbps) | Number of Walsh Channels K | Modulation | Puncture Duration Walsh Channel Gain G | Average Power per Channel $P_k$ |
|---|---|---|---|---|
| 38.4 | 1 | QPSK | $1/\sqrt{2}$ | $1/2$ |
| 76.8 | 2 | QPSK | $1/2$ | $1/4$ |
| 153.6 | 4 | QPSK | $1/2\sqrt{2}$ | $1/8$ |
| 307.2 | 8 | QPSK | $1/4$ | $1/16$ |
| 614.4 | 16 | QPSK | $1/4\sqrt{2}$ | $1/32$ |
| 1228.8 | 16 | QPSK | $1/4\sqrt{2}$ | $1/32$ |
| 2457.6 | 16 | 16-QAM | $1/4\sqrt{10}$ | $1/32$ |

In the present invention, a preamble is punctured into each traffic frame to assist mobile station 6 in the synchronization with the first slot of each variable rate transmission. In the exemplary embodiment, the preamble is an all-zero sequence, which, for a traffic frame, is spread with the long PN code but, for a control channel frame, is not spread with the long PN code. In the exemplary embodiment, the preamble is unmodulated BPSK which is orthogonally spread with Walsh cover $W_1$. The use of a single orthogonal channel minimizes the peak-to-average envelope. Also, the use of a non-zero Walsh cover $W_1$ minimizes false pilot detection since, for traffic frames, the pilot is spread with Walsh cover $W_0$ and both the pilot and the preamble are not spread with the long PN code.

The preamble is multiplexed into the traffic channel stream at the start of the packet for a duration that is a function of the data rate. The length of the preamble is such that the preamble overhead is approximately constant for all data rates while minimizing the probability of false detection. A summary of the preamble as a function of data rates is shown in Table 3. Note that the preamble comprises 3.1 percent or less of a data packet.

TABLE 3

Preamble Parameters

| Data Rate (Kbps) | Preamble Puncture Duration Walsh Symbols | PN chips | Overhead |
|---|---|---|---|
| 38.4 | 32 | 512 | 1.6% |
| 76.8 | 16 | 256 | 1.6% |
| 153.6 | 8 | 128 | 1.6% |
| 307.2 | 4 | 64 | 1.6% |
| 614.4 | 3 | 48 | 2.3% |
| 1228.8 | 4 | 64 | 3.1% |
| 2457.6 | 2 | 32 | 3.1% |

VIII. Forward Link Traffic Frame Format

In the exemplary embodiment, each data packet is formatted by the additions of frame check bits, code tail bits, and other control fields. In this specification, an octet is defined as 8 information bits and a data unit is a single octet and comprises 8 information bits.

In the exemplary embodiment, the forward link supports two data packet formats, which are illustrated in FIGS. 4E and 4F. Packet format 410 comprises five fields and packet format 430 comprises nine fields. Packet format 410 is used when the data packet to be transmitted to mobile station 6 contains enough data to completely fill all available octets in DATA field 418. If the amount of data to be transmitted is less than the available octets in DATA field 418, packet format 430 is used. The unused octets are padded with all zeros and designated as PADDING field 446.

In the exemplary embodiment, frame check sequence (FCS) fields 412 and 432 contain the CRC parity bits which are generated by CRC generator 112 (see FIG. 3A) in accordance with a predetermined generator polynomial. In the exemplary embodiment, the CRC polynomial is $g(x) = x^{16}+x^{12}+x^5+1$, although other polynomials can be used and are within the scope of the present invention. In the exemplary embodiment, the CRC bits are calculated over the FMT, SEQ, LEN, DATA, and PADDING fields. This provides error detection over all bits, except the code tail bits in TAIL fields 420 and 448, transmitted over the traffic channel on the forward link. In the alternative embodiment, the CRC bits are calculated only over the DATA field. In the exemplary embodiment, FCS fields 412 and 432 contain 16 CRC parity bits, although other CRC generators providing different number of parity bits can be used and are within the scope of the present invention. Although FCS fields 412 and 432 of the present invention has been described in the context of CRC parity bits, other frame check sequences can be used and are within the scope of the present invention. For example, a check sum can be calculated for the packet and provided in the FCS field.

In the exemplary embodiment, frame format (FMT) fields 414 and 434 contain one control bit which indicates whether the data frame contains only data octets (packet format 410) or data and padding octets and zero or more messages (packet format 430). In the exemplary embodiment, a low value for FMT field 414 corresponds to packet format 410. Alternatively, a high value for FMT field 434 corresponds to packet format 430.

Sequence number (SEQ) fields 416 and 442 identify the first data unit in data fields 418 and 444, respectively. The sequence number allows data to be transmitted out of sequence to mobile station 6, e.g., for retransmission of packets which have been received in error. The assignment of the sequence number at the data unit level eliminates the need for frame fragmentation protocol for retransmission. The sequence number also allows mobile station 6 to detect duplicate data units. Upon receipt of the FMT, SEQ, and LEN fields, mobile station 6 is able to determine which data units have been received at each time slot without the use of special signaling messages.

The number of bits assigned to represent the sequence number is dependent on the maximum number of data units, which can be transmitted in one time slot and the worse case data retransmission delays. In the exemplary embodiment, each data unit is identified by a 24-bit sequence number. At the 2.4576 Mbps data rate, the maximum number of data units, which can be transmitted at each slot is approximately 256. Eight bits are required to identify each of the data units. Furthermore, it can be calculated that the worse case data retransmission delays are less than 500 msec. The retransmission delays include the time necessary for a NACK message by mobile station 6, retransmission of the data, and the number of retransmission attempts caused by the worse case burst error runs. Therefore, 24 bits allows mobile station 6 to properly identify the data units being received without ambiguity. The number of bits in SEQ fields 416 and 442 can be increased or decreased, depending on the size of DATA field 418 and the retransmission delays. The use of different number of bits for SEQ fields 416 and 442 are within the scope of the present invention.

When base station 4 has less data to transmit to mobile station 6 than the space available in DATA field 418, packet format 430 is used. Packet format 430 allows base station 4 to transmit any number of data units, up to the maximum number of available data units, to mobile station 6. In the exemplary embodiment, a high value for FMT field 434 indicates that base station 4 is transmitting packet format 430. Within packet format 430, LEN field 440 contains the value of the number of data units being transmitted in that packet. In the exemplary embodiment, LEN field 440 is 8 bits in length since DATA field 444 can range from 0 to 255 octets.

DATA fields 418 and 444 contain the data to be transmitted to mobile station 6. In the exemplary embodiment, for packet format 410, each data packet comprises 1024 bits of which 992 are data bits. However, variable length data packets can be used to increase the number of information bits and are within the scope of the present invention. For packet format 430, the size of DATA field 444 is determined by LEN field 440.

In the exemplary embodiment, packet format 430 can be used to transmit zero or more signaling messages. Signaling length (SIG LEN) field 436 contains the length of the subsequent signaling messages, in octets. In the exemplary embodiment, SIG LEN field 436 is 8 bits in length. SIGNALING field 438 contains the signaling messages. In the exemplary embodiment, each signaling message comprises a message identification (MESSAGE ID) field, a message length (LEN) field, and a message payload, as described below.

PADDING field 446 contains padding octets which, in the exemplary embodiment, are set to 0×00 (hex). PADDING field 446 is used because base station 4 may have fewer data octets to transmit to mobile station 6 than the number of octets available in DATA field 418. When this occurs, PADDING field 446 contains enough padding octets to fill the unused data field. PADDING field 446 is variable length and depends on the length of DATA field 444.

The last field of packet formats 410 and 430 is TAIL fields 420 and 448, respectively. TAIL fields 420 and 448 contain the zero (0×0) code tail bits which are used to force encoder 114 (see FIG. 3A) into a known state at the end of each data packet. The code tail bits allow encoder 114 to succinctly partition the packet such that only bits from one packet are used in the encoding process. The code tail bits also allow the decoder within mobile station 6 to determine the packet boundaries during the decoding process. The number of bits in TAIL fields 420 and 448 depends on the design of encoder 114. In the exemplary embodiment, TAIL fields 420 and 448 are long enough to force encoder 114 to a known state.

The two packet formats described above are exemplary formats which can be used to facilitate transmission of data and signaling messages. Various other packet formats can be create to meet the needs of a particular communication system. Also, a communication system can be designed to accommodate more than the two packet formats described above.

IX. Forward Link Control Channel Frame

In the present invention, the traffic channel is also used to transmit messages from base station 4 to mobile stations 6. The types of messages transmitted include: (1) handoff direction messages, (2) paging messages (e.g., to page a specific mobile station 6 that there is data in the queue for that mobile station 6), (3) short data packets for a specific mobile station 6, and (4) ACK or NACK messages for the reverse link data transmissions (to be described later herein).

Other types of messages can also be transmitted on the control channel and are within the scope of the present invention. Upon completion of the call set up stage, mobile station 6 monitors the control channel for paging messages and begins transmission of the reverse link pilot signal.

In the exemplary embodiment, the control channel is time multiplexed with the traffic data on the traffic channel, as shown in FIG. 4A. Mobile stations 6 identify the control message by detecting a preamble which has been covered with a predetermined PN code. In the exemplary embodiment, the control messages are transmitted at a fixed rate, which is determined by mobile station 6 during acquisition. In the preferred embodiment, the data rate of the control channel is 76.8 Kbps.

The control channel transmits messages in control channel capsules. The diagram of an exemplary control channel capsule is shown in FIG. 4G. In the exemplary embodiment, each capsule comprises preamble 462, the control payload, and CRC parity bits 474. The control payload comprises one or more messages and, if necessary, padding bits 472. Each message comprises message identifier (MSG ID) 464, message length (LEN) 466, optional address (ADDR) 468 (e.g., if the message is directed to a specific mobile station 6), and message payload 470. In the exemplary embodiment, the messages are aligned to octet boundaries. The exemplary control channel capsule illustrated in FIG. 4G comprises two broadcast messages intended for all mobile stations 6 and one message directed at a specific mobile station 6. MSG ID field 464 determines whether or not the message requires an address field (e.g., whether it is a broadcast or a specific message).

X. Forward Link Pilot Channel

In the present invention, a forward link pilot channel provides a pilot signal that is used by mobile stations 6 for initial acquisition, phase recovery, timing recovery, and ratio combining. These uses are similar to that of the CDMA communication systems that conform to IS-95 standard. In the exemplary embodiment, mobile stations 6 to perform the C/I measurement also use the pilot signal.

The exemplary block diagram of the forward link pilot channel of the present invention is shown in FIG. 3A. The pilot data comprises a sequence of all zeros (or all ones), which is provided to multiplier 156. Multiplier 156 covers the pilot data with Walsh code $W_0$. Since Walsh code $W_0$ is a sequence of all zeros, the output of multiplier 156 is the pilot data. The pilot data is time multiplexed by MUX 162 and provided to the I Walsh channel, which is spread by the short $PN_I$ code within complex multiplier 214 (see FIG. 3B). In the exemplary embodiment, the pilot data is not spread with the long PN code, which is gated off during the pilot burst by MUX 234, to allow reception by all mobile stations 6. The pilot signal is thus an unmodulated BPSK signal.

A diagram illustrating the pilot signal is shown in FIG. 4B. In the exemplary embodiment, each time slot comprises two pilot bursts 306a and 306b, which occur at the end of the first and third quarters of the time slot. In the exemplary embodiment, each pilot burst 306 is 64 chips in duration (Tp=64 chips). In the absence of traffic data or control channel data, base station 4 only transmits the pilot and power control bursts, resulting in a discontinuous waveform bursting at the periodic rate of 1200 Hz. The pilot modulation parameters are tabulated in Table 4.

XI. Reverse Link Power Control

In the present invention, the forward link power control channel is used to send the power control command which is used to control the transmit power of the reverse link transmission from remote station 6. On the reverse link, each transmitting mobile station 6 acts as a source of interference to all other mobile stations 6 in the network. To minimize interference on the reverse link and maximize capacity, the transmit power of each mobile station 6 is controlled by two power control loops. In the exemplary embodiment, the power control loops are similar to that of the CDMA system disclosed in detail in U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the assignee of the present invention and incorporated by reference herein. Other power control mechanism can also be contemplated and are within the scope of the present invention.

The first power control loop adjusts the transmit power of mobile station 6 such that the reverse link signal quality is maintained at a set level. The signal quality is measured as the energy-per-bit-to-noise-plus-interference ratio $E_b/I_o$ of the reverse link signal received at base station 4. The set level is referred to as the $E_b/I_o$ set point. The second power control loop adjusts the set point such that the desired level of performance, as measured by the frame-error-rate (FER), is maintained. Power control is critical on the reverse link because the transmit power of each mobile station 6 is an interference to other mobile stations 6 in the communication system. Minimizing the reverse link transmit power reduces the interference and increases the reverse link capacity.

Within the first power control loop, the $E_b/I_o$ of the reverse link signal is measured at base station 4. Base station 4 then compares the measured $E_b/I_o$ with the set point. If the measured $E_b/I_o$ is greater than the set point, base station 4 transmits a power control message to mobile station 6 to decrease the transmit power. Alternatively, if the measured $E_b/I_o$ is below the set point, base station 4 transmits a power control message to mobile station 6 to increase the transmit power. In the exemplary embodiment, the power control message is implemented with one power control bit. In the exemplary embodiment, a high value for the power control bit commands mobile station 6 to increase its transmit power and a low value commands mobile station 6 to decrease its transmit power.

In the present invention, the power control bits for all mobile stations 6 in communication with each base station 4 are transmitted on the power control channel. In the exemplary embodiment, the power control channel comprises up to 32 orthogonal channels, which are spread with the 16-bit Walsh covers. Each Walsh channel transmits one reverse power control (RPC) bit or one FAC bit at periodic intervals. Each active mobile station 6 is assigned an RPC index, which defines the Walsh cover and QPSK modulation phase (e.g., inphase or quadrature) for transmission of the RPC bit stream destined for that mobile station 6. In the exemplary embodiment, the RPC index of 0 is reserved for the FAC bit.

The exemplary block diagram of the power control channel is shown in FIG. 3A. The RPC bits are provided to symbol repeater 150, which repeats each RPC bit a predetermined number of times. The repeated RPC bits are provided to Walsh cover element 152, which covers the bits with the Walsh covers corresponding to the RPC indices. The covered bits are provided to gain element 154 which scales the bits prior to modulation so as to maintain a constant total transmit power. In the exemplary embodiment, the gains of the RPC Walsh channels are normalized so that the total RPC channel power is equal to the total available transmit power. The gains of the Walsh channels can be varied as a function of time for efficient utilization of the total base station transmit power while maintaining reliable RPC transmission to all active mobile stations 6. In the exemplary embodiment, the Walsh channel gains of inactive mobile stations 6 are set to zero. Automatic power control of the RPC Walsh channels is possible using estimates of the forward link quality measurement from the corresponding DRC channel from mobile stations 6. The scaled RPC bits from gain element 154 are provided to MUX 162.

Figure 4C:
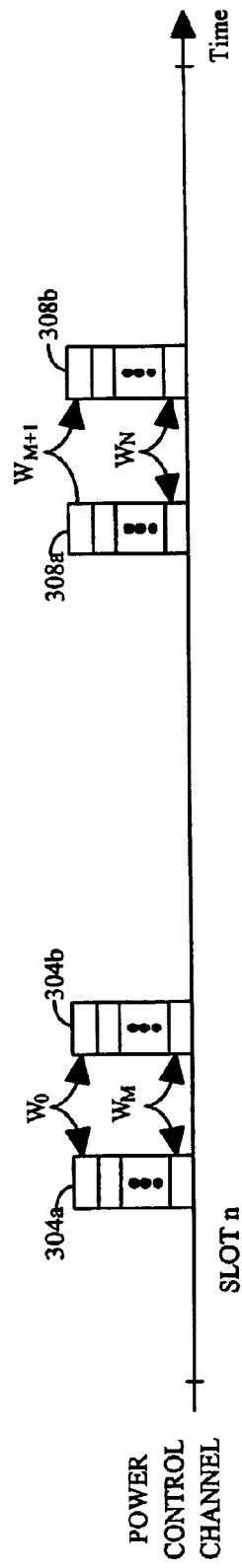
Figure 4D:
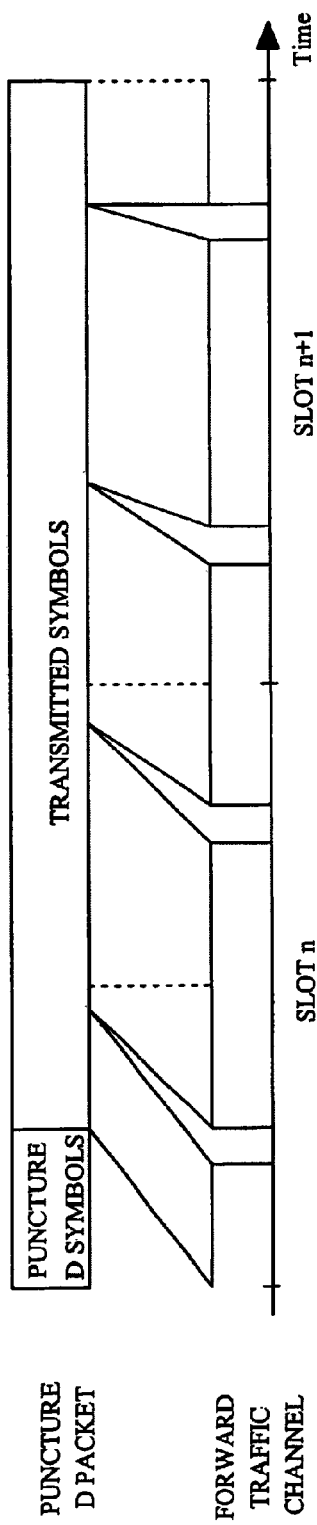
FIG. 4D is a diagram of the punctured packet of the present invention.

In the exemplary embodiment, the RPC indices of 0 through 15 are assigned to Walsh covers $W_0$ through $W_{15}$, respectively, and are transmitted around the first pilot burst within a slot (RPC bursts 304 in FIG. 4C). The RPC indices of 16 through 31 are assigned to Walsh covers $W_0$ through $W_{15}$, respectively, and are transmitted around the second pilot burst within a slot (RPC bursts 308 in FIG. 4C). In the exemplary embodiment, the RPC bits are BPSK modulated with the even Walsh covers (e.g., $W_0$, $W_2$, $W_4$, etc.) modulated on the inphase signal and the odd Walsh covers (e.g., $W_1$, $W_3$, $W_5$, etc.) modulated on the quadrature signal. To reduce the peak-to-average envelope, it is preferable to balance the inphase and quadrature power. Furthermore, to minimize cross-talk due to demodulator phase estimate error, it is preferable to assign orthogonal covers to the inphase and quadrature signals.

In the exemplary embodiment, up to 31 RPC bits can be transmitted on 31 RPC Walsh channels in each time slot. In the exemplary embodiment, 15 RPC bits are transmitted on the first half slot and 16 RPC bits are transmitted on the second half slot. The RPC bits are combined by summers 212 (see FIG. 3B) and the composite waveform of the power control channel is as shown is in FIG. 4C.

A timing diagram of the power control channel is illustrated in FIG. 4B. In the exemplary embodiment, the RPC bit rate is 600 bps, or one RPC bit per time slot. Each RPC bit is time multiplexed and transmitted over two RPC bursts (e.g., RPC bursts 304a and 304b), as shown in FIGS. 4B and 4C. In the exemplary embodiment, each RPC burst is 32 PN chips (or 2 Walsh symbols) in width (Tpc=32 chips) and the total width of each RPC bit is 64 PN chips (or 4 Walsh symbols). Other RPC bit rates can be obtained by changing the number of symbol repetition. For example, an RPC bit rate of 1200 bps (to support up to 63 mobile stations 6 simultaneously or to increase the power control rate) can be obtained by transmitting the first set of 31 RPC bits on RPC bursts 304a and 304b and the second set of 32 RPC bits on RPC bursts 308a and 308b. In this case, all Walsh covers are used in the inphase and quadrature signals. The modulation parameters for the RPC bits are summarized in Table 4.

TABLE 4

Pilot and Power Control Modulation Parameters

| Parameter | RPC | FAG | Pilot | Units |
|---|---|---|---|---|
| Rate | 600 | 75 | 1200 | Hz |
| Modulation format | QPSK | QPSK | BPSK | |
| Duration of control bit | 64 | 1024 | 64 | PN chips |
| Repeat | 4 | 64 | 4 | symbols |

The power control channel has a bursty nature since the number of mobile stations 6 in communication with each base station 4 can be less than the number of available RPC Walsh channels. In this situation, some RPC Walsh channels are set to zero by proper adjustment of the gains of gain element 154.

In the exemplary embodiment, the RPC bits are transmitted to mobile stations 6 without coding or interleaving to minimize processing delays. Furthermore, the erroneous reception of the power control bit is not detrimental to the data communication system of the present invention since the error can be corrected in the next time slot by the power control loop.

In the present invention, mobile stations 6 can be in soft handoff with multiple base stations 4 on the reverse link. The method and apparatus for the reverse link power control for mobile station 6 in soft handoff is disclosed in the aforementioned U.S. Pat. No. 5,056,109. Mobile station 6 in soft handoff monitors the RPC Walsh channel for each base station 4 in the active set and combines the RPC bits in accordance with the method disclosed in the aforementioned U.S. Pat. No. 5,056,109. In the first embodiment, mobile station 6 performs the logic OR of the down power commands. Mobile station 6 decreases the transmit power if any one of the received RPC bits commands mobile station 6 to decrease the transmit power. In the second embodiment, mobile station 6 in soft handoff can combine the soft decisions of the RPC bits before making a hard decision. Other embodiments for processing the received RPC bits can be contemplated and are within the scope of the present invention.

In the present invention, the FAC bit indicates to mobile stations 6 whether or not the traffic channel of the associated pilot channel will be transmitting on the next half frame. The use of the FAC bit improves the C/I estimate by mobile stations 6, and hence the data rate request, by broadcasting the knowledge of the interference activity. In the exemplary embodiment, the FAC bit only changes at half frame boundaries and is repeated for eight successive time slots, resulting in a bit rate of 75 bps. The parameters for the FAC bit is listed in Table 4.

Using the FAC bit, mobile stations 6 can compute the C/I measurement as follows:

$$\left(\frac{C}{I}\right)_i = \frac{C_i}{I - \sum_{j \neq i} (1 - \alpha_j) C_j}, \quad (3)$$

where $(C/I)_i$ is the C/I measurement of the $i^{th}$ forward link signal, $C_i$ is the total received power of the $i^{th}$ forward link signal, $C_j$ is the received power of the $j^{th}$ forward link signal, I is the total interference if all base stations 4 are transmitting, $\alpha_j$ is the FAC bit of the $j^{th}$ forward link signal and can be 0 or 1 depending on the FAC bit.

XII. Reverse Link Data Transmission

In the present invention, the reverse link supports variable rate data transmission. The variable rate provides flexibility and allows mobile stations 6 to transmit at one of several data rates, depending on the amount of data to be transmitted to base station 4. In the exemplary embodiment, mobile station 6 can transmit data at the lowest data rate at any time. In the exemplary embodiment, data transmission at higher data rates requires a grant by base station 4. This implementation minimizes the reverse link transmission delay while providing efficient utilization of the reverse link resource.

Figure 8:
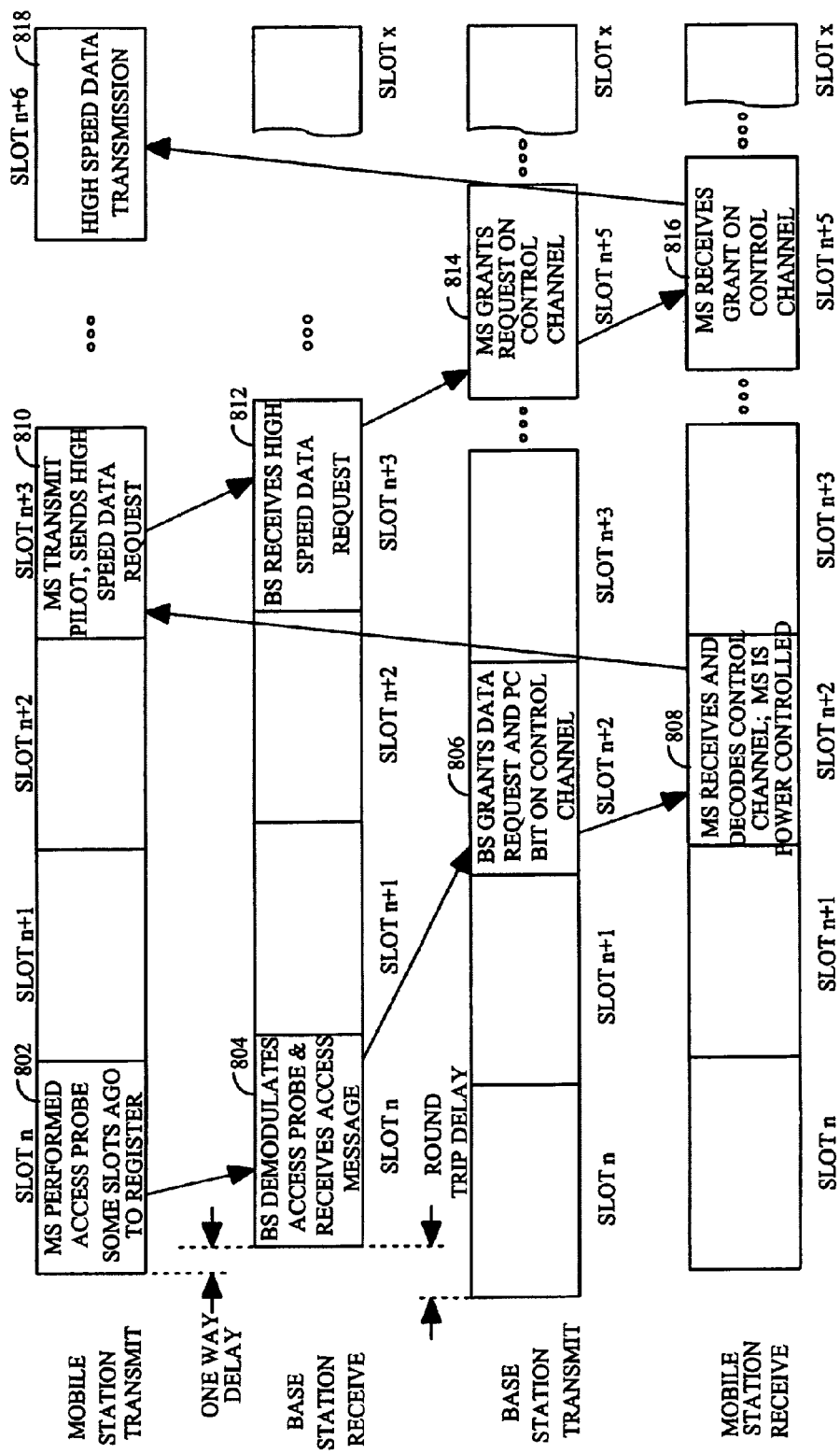
FIG. 8 is an exemplary timing diagram showing the high rate data transmission on the reverse link.

An exemplary illustration of the flow diagram of the reverse link data transmission of the present invention is shown in FIG. 8. Initially, at slot n, mobile station 6 performs an access probe, as described in the aforementioned U.S. Pat. No. 5,289,527, to establish the lowest rate data channel on the reverse link at block 802. In the same slot n, base station 4 demodulates the access probe and receives the access message at block 804. Base station 4 grants the request for the data channel and, at slot n+2, transmits the grant and the assigned RPC index on the control channel, at block 806. At slot n+2, mobile station 6 receives the grant and is power controlled by base station 4, at block 808. Beginning at slot n+3, mobile station 6 starts transmitting the pilot signal and has immediate access to the lowest rate data channel on the reverse link.

If mobile station 6 has traffic data and requires a high rate data channel, mobile station 6 can initiate the request at block 810. At slot n+3, base station 4 receives the high speed data request, at block 812. At slot n+5, base station 4 transmits the grant on the control channel, at block 814. At slot n+5, mobile station 6 receives the grant at block 816 and begins high speed data transmission on the reverse link starting at slot n+6, at block 818.

XIII. Reverse Link Architecture

In the data communication system of the present invention, the reverse link transmission differs from the forward link transmission in several ways. On the forward link, data transmission typically occurs from one base station 4 to one mobile station 6. However, on the reverse link, each base station 4 can concurrently receive data transmissions from multiple mobile stations 6. In the exemplary embodiment, each mobile station 6 can transmit at one of several data rates depending on the amount of data to be transmitted to base station 4. This system design reflects the asymmetric characteristic of data communication.

In the exemplary embodiment, the time base unit on the reverse link is identical to the time base unit on the forward link. In the exemplary embodiment, the forward link and reverse link data transmissions occur over time slots, which are 1.667 msec in duration. However, since data transmission on the reverse link typically occurs at a lower data rate, a longer time base unit can be used to improve efficiency.

In the exemplary embodiment, the reverse link supports two channels: the pilot/DRC channel and the data channel. The function and implementation of each of this channel are described below. The pilot/DRC channel is used to transmit the pilot signal and the DRC messages and the data channel is used to transmit traffic data.

Figure 7A:
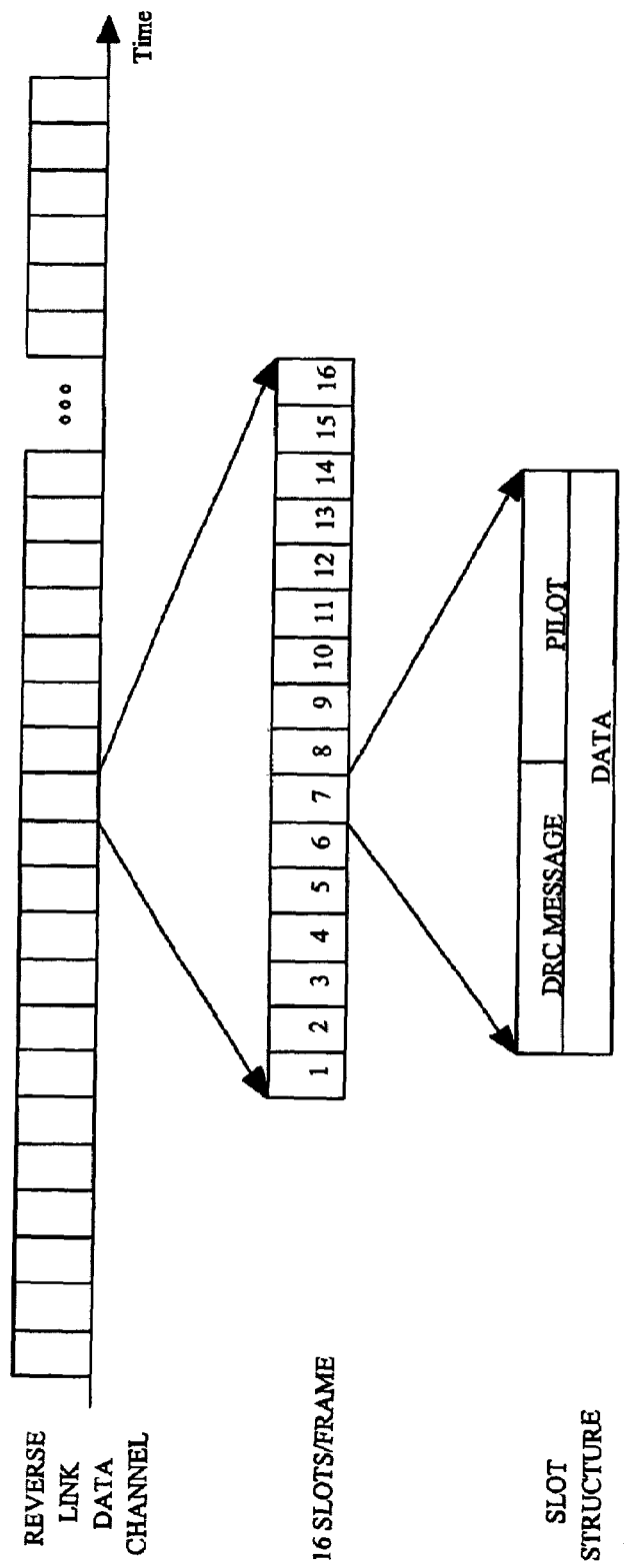
FIG. 7A is a diagram of the exemplary reverse link frame structure of the present invention.

A diagram of the exemplary reverse link frame structure of the present invention is illustrated in FIG. 7A. In the exemplary embodiment, the reverse link frame structure is similar to the forward link frame structure shown in FIG. 4A. However, on the reverse link, the pilot/DRC data and traffic data are transmitted concurrently on the in-phase and quadrature channels.

In the exemplary embodiment, mobile station 6 transmits a DRC message on the pilot/DRC channel at each time slot whenever mobile station 6 is receiving high speed data transmission. Alternatively, when mobile station 6 is not receiving high speed data transmission, the entire slot on the pilot/DRC channel comprises the pilot signal. The pilot signal is used by the receiving base station 4 for a number of functions: as an aid to initial acquisition, as a phase reference for the pilot/DRC and the data channels, and as the source for the closed loop reverse link power control.

In the exemplary embodiment, the bandwidth of the reverse link is selected to be 1.2288 MHz. This bandwidth selection allows the use of existing hardware designed for a CDMA system which conforms to the IS-95 standard. However, other bandwidths can be utilized to increase capacity and/or to conform to system requirements. In the exemplary embodiment, the same long PN code and short $PN_I$ and $PN_Q$ codes as those specified by the IS-95 standard are used to spread the reverse link signal. In the exemplary embodiment, the reverse link channels are transmitted using QPSK modulation. Alternatively, OQPSK modulation can be used to minimize the peak-to-average amplitude variation of the modulated signal which can result in improved performance. The use of different system bandwidth, PN codes, and modulation schemes can be contemplated and are within the scope of the present invention.

In the exemplary embodiment, the transmit power of the reverse link transmissions on the pilot/DRC channel and the data channel are controlled such that the $E_b/I_o$ of the reverse link signal, as measured at base station 4, is maintained at a predetermined $E_b/I_o$ set point as discussed in the aforementioned U.S. Pat. No. 5,506,109. The power control is maintained by base stations 4 in communication with the mobile station 6 and the commands are transmitted as the RPC bits as discussed above.

XIV. Reverse Link Data Channel

Figure 6:
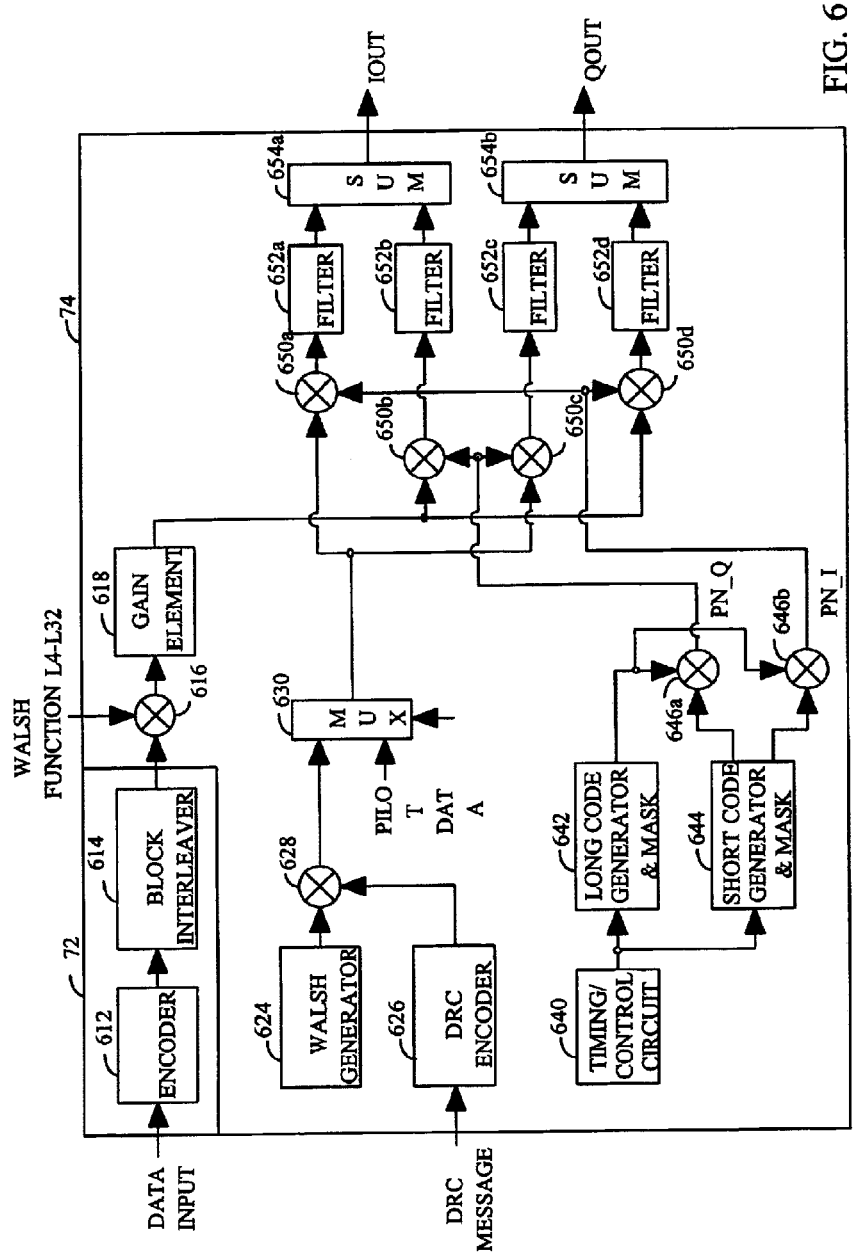
FIG. 6 is a block diagram of the exemplary reverse link architecture of the present invention.

A block diagram of the exemplary reverse link architecture of the present invention is shown in FIG. 6. The data is partitioned into data packets and provided to encoder 612. For each data packet, encoder 612 generates the CRC parity bits, inserts the code tail bits, and encodes the data. In the exemplary embodiment, encoder 612 encodes the packet in accordance with the encoding format disclosed in the aforementioned U.S. Pat. No. 5,933,462. Other encoding formats can also be used and are within the scope of the present invention. The encoded packet from encoder 612 is provided to block interleaver 614, which reorders the code symbols in the packet. The interleaved packet is provided to multiplier 616, which covers the data with the Walsh cover and provides the covered data to gain element 618. Gain element 618 scales the data to maintain a constant energy-per-bit $E_b$ regardless of the data rate. The scaled data from gain element 618 is provided to multipliers 650b and 650d, which spread the data with the PN_Q and PN_I sequences, respectively. The spread data from multipliers 652b and 650d are provided to filters 652b and 652d, respectively, which filter the data. The filtered signals from filters 652a and 652b are provided to summer 654a and the filtered signals from filter 652c and 652d are provided to summer 654b. Summers 654 sum the signals from the data channel with the signals from the pilot/DRC channel. The outputs of summers 654a and 654b comprise IOUT and QOUT, respectively, which are modulated with the in-phase sinusoid $COS(w_c t)$ and the quadrature sinusoid $SIN(w_c t)$, respectively (as in the forward link), and summed (not shown in FIG. 6). In the exemplary embodiment, the traffic data is transmitted on both the inphase and quadrature phase of the sinusoid.

In the exemplary embodiment, the data is spread with the long PN code and the short PN codes. The long PN code scrambles the data such that the receiving base station 4 is able to identify the transmitting mobile station 6. The short PN code spreads the signal over the system bandwidth. The long PN sequence is generated by long code generator 642 and provided to multipliers 646. The short $PN_I$ and $PN_Q$ sequences are generated by short code generator 644 and also provided to multipliers 646a and 646b, respectively, which multiply the two sets of sequences to form the PN_I and PN_Q signals, respectively. Timing/control circuit 640 provides the timing reference.

The exemplary block diagram of the data channel architecture as shown in FIG. 6 is one of numerous architectures which support data encoding and modulation on the reverse link. For high rate data transmission, an architecture similar to that of the forward link utilizing multiple orthogonal channels can also be used. Other architectures, such as the architecture for the reverse link traffic channel in the CDMA system which conforms to the IS-95 standard, can also be contemplated and are within the scope of the present invention.

In the exemplary embodiment, the reverse link data channel supports four data rates which are tabulated in Table 5. Additional data rates and/or different data rates can be supported and are within the scope of the present invention. In the exemplary embodiment, the packet size for the reverse link is dependent on the data rate, as shown in Table 5. As described in the aforementioned U.S. Pat. No. 5,933,462, improved decoder performance can be obtained for larger packet sizes. Thus, different packet sizes than those listed in Table 5 can be utilized to improve performance and are within the scope of the present invention. In addition, the packet size can be made a parameter, which is independent of the data rate.

TABLE 5

Pilot and Power Control Modulation Parameters

| Parameter | Data rates | | | | Units |
|---|---|---|---|---|---|
| | 9.6 | 19.2 | 38.4 | 76.8 | Kbps |
| Frame duration | 26.66 | 26.66 | 13.33 | 13.33 | msec |
| Data packet length | 245 | 491 | 491 | 1003 | bits |
| CRC length | 16 | 16 | 16 | 16 | bits |
| Code tail bits | 5 | 5 | 5 | 5 | bits |
| Total bits/packet | 256 | 512 | 512 | 1024 | bits |
| Encoded packet length | 1024 | 2048 | 2048 | 4096 | symbols |
| Walsh symbol length | 32 | 16 | 8 | 4 | chips |
| Request required | no | yes | yes | yes | |

As shown in Table 5, the reverse link supports a plurality of data rates. In the exemplary embodiment, the lowest data rate of 9.6 Kbps is allocated to each mobile station 6 upon registration with base station 4. In the exemplary embodiment, mobile stations 6 can transmit data on the lowest rate data channel at any time slot without having to request permission from base station 4. In the exemplary embodiment, data transmission at the higher data rates are granted by the selected base station 4 based on a set of system parameters such as the system loading, fairness, and total throughput. An exemplary scheduling mechanism for high speed data transmission is described in detail in the aforementioned U.S. Pat. No. 6,335,922.

XV. Reverse Link Pilot/DRC Channel

The exemplary block diagram of the pilot/DRC channel is shown in FIG. 6. The DRC message is provided to DRC encoder 626, which encodes the message in accordance with a predetermined coding format. Coding of the DRC message is important since the error probability of the DRC message needs to be sufficiently low because incorrect forward link data rate determination impacts the system throughput performance. In the exemplary embodiment, DRC encoder 626 is a rate (8,4) CRC block encoder that encodes the 3-bit DRC message into an 8-bit code word. The encoded DRC message is provided to multiplier 628, which covers the message with the Walsh code, which uniquely identifies the destination base station 4 for which the DRC message is directed. The Walsh code is provided by Walsh generator 624. The covered DRC message is provided to multiplexer (MUX)

630, which multiplexes the message with the pilot data. The DRC message and the pilot data are provided to multipliers 650a and 650c, which spread the data with the PN_I and PN_Q signals, respectively. Thus, the pilot and DRC message are transmitted on both the inphase and quadrature phase of the sinusoid.

In the exemplary embodiment, the DRC message is transmitted to the selected base station 4. This is achieved by covering the DRC message with the Walsh code, which identifies the selected base station 4. In the exemplary embodiment, the Walsh code is 128 chips in length. The derivation of 128-chip Walsh codes are known in the art. One unique Walsh code is assigned to each base station 4, which is in communication with mobile station 6. Each base station 4 decovers the signal on the DRC channel with its assigned Walsh code. The selected base station 4 is able to decover the DRC message and transmits data to the requesting mobile station 6 on the forward link in response thereto. Other base stations 4 are able to determine that the requested data rate is not directed to them because these base stations 4 are assigned different Walsh codes.

In the exemplary embodiment, the reverse link short PN codes for all base stations 4 in the data communication system is the same and there is no offset in the short PN sequences to distinguish different base stations 4. The data communication system of the present invention supports soft handoff on the reverse link. Using the same short PN codes with no offset allows multiple base stations 4 to receive the same reverse link transmission from mobile station 6 during a soft handoff. The short PN codes provide spectral spreading but do not allow for identification of base stations 4.

In the exemplary embodiment, the DRC message carries the requested data rate by mobile station 6. In the alternative embodiment, the DRC message carries an indication of the forward link quality (e.g., the C/I information as measured by mobile station 6). Mobile station 6 can simultaneously receive the forward link pilot signals from one or more base stations 4 and performs the C/I measurement on each received pilot signal. Mobile station 6 then selects the best base station 4 based on a set of parameters, which can comprise present and previous C/I measurements. The rate control information is formatted into the DRC message which can be conveyed to base station 4 in one of several embodiments.

In the first embodiment, mobile station 6 transmits a DRC message based on the requested data rate. The requested data rate is the highest supported data rate which yields satisfactory performance at the C/I measured by mobile station 6. From the C/I measurement, mobile station 6 first calculates the maximum data rate, which yields satisfactory performance. The maximum data rate is then quantized to one of the supported data rates and designated as the requested data rate. The data rate index corresponding to the requested data rate is transmitted to the selected base station 4. An exemplary set of supported data rates and the corresponding data rate indices are shown in Table 1.

Figure 10:
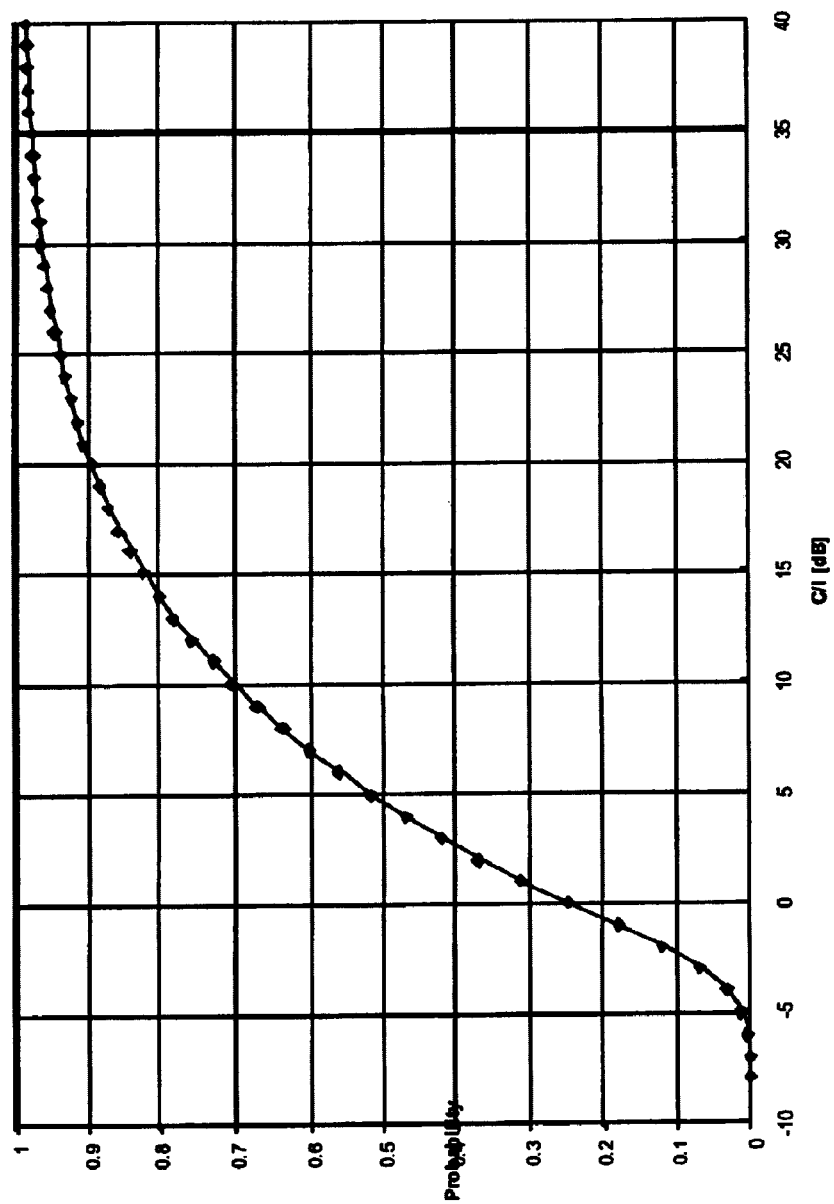
FIG. 10 is a diagram of the cumulative distribution function (CDF) of the C/I distribution in an ideal hexagonal cellular layout.

In the second embodiment, wherein mobile station 6 transmits an indication of the forward link quality to the selected base station 4, mobile station 6 transmits a C/I index, which represents the quantized value of the C/I measurement. The C/I measurement can be mapped to a table and associated with a C/I index. Using more bits to represent the C/I index allows a finer quantization of the C/I measurement. Also, the mapping can be linear or predistorted. For a linear mapping, each increment in the C/I index represents a corresponding increase in the C/I measurement. For example, each step in the C/I index can represent a 2.0 dB increase in the C/I measurement. For a predistorted mapping, each increment in the C/I index can represent a different increase in the C/I measurement. As an example, a predistorted mapping can be used to quantize the C/I measurement to match the cumulative distribution function (CDF) curve of the C/I distribution as shown in FIG. 10.

Other embodiments to convey the rate control information from mobile station 6 to base station 4 can be contemplated and are within the scope of the present invention. Furthermore, the use of different number of bits to represent the rate control information is also within the scope of the present invention. Throughout much of the specification, the present invention is described in the context of the first embodiment, the use of a DRC message to convey the requested data rate, for simplicity.

In the exemplary embodiment, the C/I measurement can be performed on the forward link pilot signal in the manner similar to that used in the CDMA system. A method and apparatus for performing the C/I measurement is disclosed in U.S. patent application Ser. No. 08/722,763, entitled "METHOD AND APPARATUS FOR MEASURING LINK QUALITY IN A SPREAD SPECTRUM COMMUNICATION SYSTEM", filed Sep. 27, 1996, now U.S. Pat. No. 5,903,554, issued May 11, 1999, by Keith W. Saints, assigned to the assignee of the present invention and incorporated by reference herein. In summary, the C/I measurement on the pilot signal can be obtained by despreading the received signal with the short PN codes. The C/I measurement on the pilot signal can contain inaccuracies if the channel condition changed between the time of the C/I measurement and the time of actual data transmission. In the present invention, the use of the FAC bit allows mobile stations 6 to take into consideration the forward link activity when determining the requested data rate.

In the alternative embodiment, the C/I measurement can be performed on the forward link traffic channel. The traffic channel signal is first despread with the long PN code and the short PN codes and decovered with the Walsh code. The C/I measurement on the signals on the data channels can be more accurate because a larger percentage of the transmitted power is allocated for data transmission. Other methods to measure the C/I of the received forward link signal by mobile station 6 can also be contemplated and are within the scope of the present invention.

In the exemplary embodiment, the DRC message is transmits in the first half of the time slot (see FIG. 7A). For an exemplary time slot of 1.667 msec, the DRC message comprises the first 1024 chips or 0.83 msec of the time slot. The remaining 1024 chips of time are used by base station 4 to demodulate and decode the message. Transmission of the DRC message in the earlier portion of the time slot allows base station 4 to decode the DRC message within the same time slot and possibly transmit data at the requested data rate at the immediate successive time slot. The short processing delay allows the communication system of the present invention to quickly adapt to changes in the operating environment.

In the alternative embodiment, the requested data rate is conveyed to base station 4 by the use of an absolute reference and a relative reference. In this embodiment, the absolute reference comprising the requested data rate is transmitted periodically. The absolute reference allows base station 4 to determine the exact data rate requested by mobile station 6. For each time slots between transmissions of the absolute references, mobile station 6 transmits a relative reference to base station 4 which indicates whether the requested data rate for the upcoming time slot is higher, lower, or the same as the requested data rate for the previous time slot. Periodically, mobile station 6 transmits an absolute reference. Periodic transmission of the data rate index allows the requested data rate to be set to a known state and ensures that erroneous receptions of relative references do not accumulate. The use of absolute references and relative references can reduce the transmission rate of the DRC messages to base station 6. Other protocols to transmit the requested data rate can also be contemplated and are within the scope of the present invention.

XVI. Reverse Link Access Channel

The access channel is used by mobile station 6 to transmit messages to base station 4 during the registration phase. In the exemplary embodiment, the access channel is implemented using a slotted structure with each slot being accessed at random by mobile station 6. In the exemplary embodiment, the access channel is time multiplexed with the DRC channel.

Figure 7B:
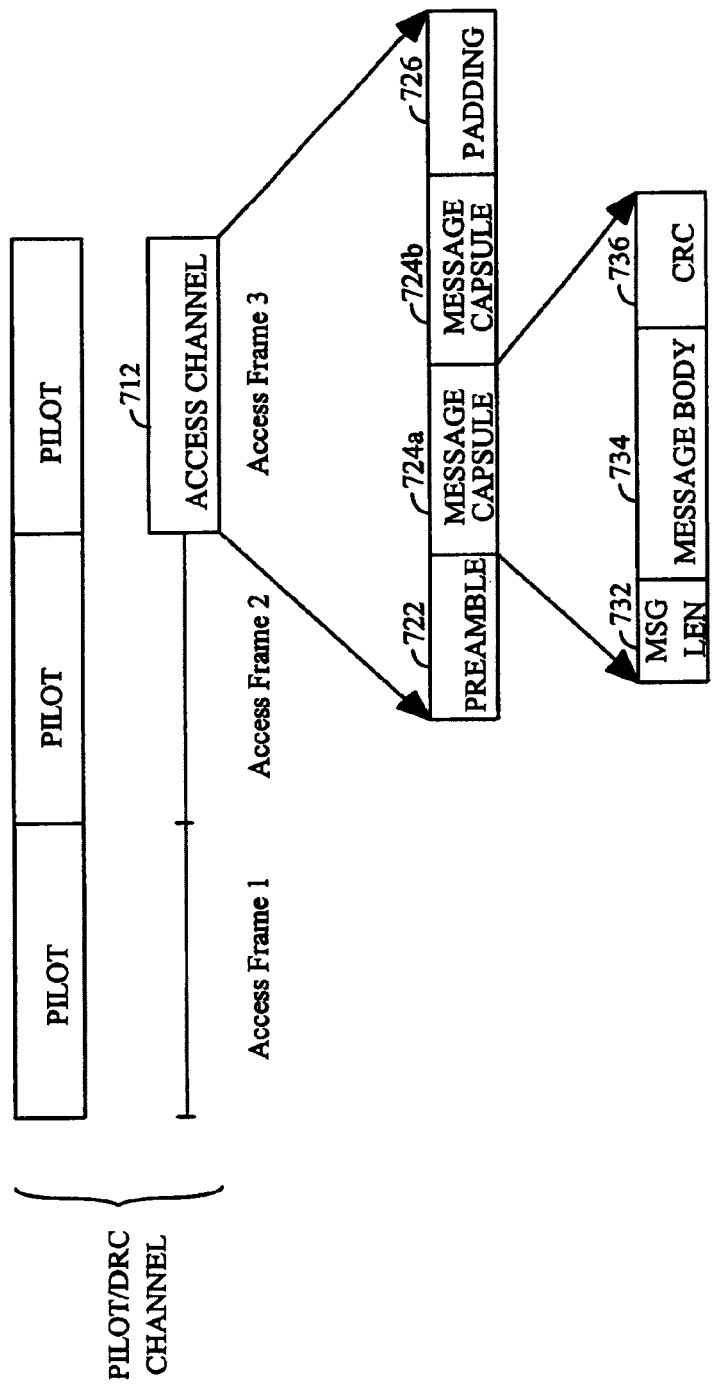
FIG. 7B is a diagram of the exemplary reverse link access channel.

In the exemplary embodiment, the access channel transmits messages in access channel capsules. In the exemplary embodiment, the access channel frame format is identical to that specified by the IS-95 standard, except that the timing is in 26.67 msec frames instead of the 20 msec frames specified by IS-95 standard. The diagram of an exemplary access channel capsule is shown in FIG. 7B. In the exemplary embodiment, each access channel capsule 712 comprises preamble 722, one or more message capsules 724, and padding bits 726. Each message capsule 724 comprises message length (MSG LEN) field 732, message body 734, and CRC parity bits 736.

XVII. Reverse Link NACK Channel

In the present invention, mobile station 6 transmits the NACK messages on the data channel. The NACK message is generated for each packet received in error by mobile station 6. In the exemplary embodiment, the NACK messages can be transmitted using the Blank and Burst signaling data format as disclosed in the aforementioned U.S. Pat. No. 5,504,773.

Although the present invention has been described in the context of a NACK protocol, the use of an ACK protocol can be contemplated and are within the scope of the present invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of data rate control for signals transmitted in a wireless communication system during each time frame from a first entity to a second entity, the method comprising:
   receiving a data rate control message for each time frame at the first entity from the second entity, the data rate control message identifying a maximum data rate for transmission of signals from the first entity to the second entity over a wireless channel; and
   transmitting a signal from the first entity to the second entity during a next time frame at a data rate based on a last received data rate control message.

2. The method of claim 1, wherein the wireless channel includes a forward link for transmission from the first entity to the second entity and a reverse link for transmission from the second entity to the first entity, and wherein the maximum data rate is for forward link transmissions.

3. The method of claim 2, wherein the maximum data rate is one of a set of supported data rates.

4. The method of claim 3, wherein the first entity is an infrastructure apparatus and the second entity is a mobile station, the method further comprising:
   selecting at the first entity a data rate based on the last received data rate control message, wherein the data rate is less than or equal to the maximum data rate and greater than or equal to a minimum data rate.

5. The method of claim 4, wherein the data rate is equal to the maximum data rate.

6. The method of claim 5, wherein the selecting comprises selecting the data rate from the set of supported data rates.

7. The method of claim 5, wherein the selecting comprises selecting a channel coding configuration corresponding to the data rate during the time frame.

8. The method of claim 5, wherein the selecting comprises selecting a packet format corresponding to the data rate.

9. The method of claim 5, wherein the selecting comprises selecting a quantity of user data corresponding to the data rate for transmission during the time frame.

10. An infrastructure apparatus configured to transmit signals to a mobile station over a wireless channel, the infrastructure apparatus comprising:
    means for receiving from the mobile station a data rate control message for each time frame, the data rate control message identifying a maximum data rate for transmission of signals from the infrastructure apparatus to the mobile station over the wireless channel; and
    means for transmitting the signal during a next time frame at a data rate based on the last received data rate control message.

11. The infrastructure apparatus of claim 10, wherein the wireless channel includes a forward link for transmission from the infrastructure apparatus to the mobile station and a reverse link for transmission from the mobile station to the infrastructure apparatus, and wherein the maximum data rate is for the forward link.

12. The infrastructure apparatus of claim 10, wherein the maximum data rate is one of a set of supported data rates.

13. The infrastructure apparatus of claim 12, further comprising:
    means for selecting at the infrastructure apparatus a data rate based on the last received data rate control message, wherein the data rate is less than or equal to the maximum data rate and greater than or equal to a minimum data rate.

14. The infrastructure apparatus of claim 13, wherein the means for selecting the data rate comprises means for selecting a channel coding configuration corresponding to the data rate.

15. The infrastructure apparatus of claim 13, wherein the means for selecting the data rate comprises means for selecting a packet format corresponding to the data rate.

16. The infrastructure apparatus of claim 13, wherein the means for selecting the data rate comprises means for selecting a quantity of user data corresponding to the data rate for transmission during the time frame.

17. An infrastructure apparatus configured to transmit signals to a mobile station over a wireless channel, the infrastructure apparatus comprising:
    a receiver configured to receive from the mobile station a data rate control message for each time frame, the data rate control message identifying a maximum data rate for transmission of signals from the infrastructure apparatus to the mobile station over the wireless channel; and a transmitter coupled to the receiver and configured to transmit a signal during a next time frame at a data rate based on a last received data rate control message.

18. The infrastructure apparatus of claim 17, wherein the wireless channel includes a forward link for transmission from the infrastructure apparatus to the mobile station and a reverse link for transmission from the mobile station to the infrastructure apparatus, and wherein the maximum data rate is for the forward link.

19. The infrastructure apparatus of claim 17, further comprising:
a selector element coupled to the receiver and the transmitter and configured to select the data rate from a set of supported data rates based on the last received data rate control message.

20. The infrastructure apparatus of claim 19, wherein the selector element is configured to select a channel coding configuration for transmission of the signal during the time frame, wherein the selected channel coding configuration corresponds to the data rate.

21. The infrastructure apparatus of claim 19, wherein the selector element is configured to select a packet format for transmission of the signal during the time frame, wherein the selected packet format corresponds to the data rate.

22. The infrastructure apparatus of claim 19, wherein the selector element is configured to select a quantity of user data for transmission of the signal during the time frame, wherein the selected quantity of user data corresponds to the data rate.

23. A mobile station for receiving a signal through a wireless channel from an infrastructure apparatus, the mobile station comprising:
means for transmitting to the infrastructure apparatus a data rate control message during each time frame, the data rate control message identifying a maximum data rate for receiving transmissions from the infrastructure apparatus on the wireless channel; and
means for receiving from the infrastructure apparatus the signal at a data rate during a subsequent time frame, wherein the data rate is based on the data rate control message.

24. The mobile station of claim 23, further comprising:
means for measuring a carrier-to-interference ratio for the wireless channel to determine the maximum data rate.

25. The mobile station of claim 24, wherein the wireless channel includes a forward link for transmission from the infrastructure apparatus to the mobile station and a reverse link for transmission from the mobile station to the infrastructure apparatus, and wherein the maximum data rate is for the forward link.

26. The mobile station of claim 24, wherein the means for receiving comprises means for determining a packet format of the received signal, wherein the packet format corresponds to the data rate.

27. The mobile station of claim 24, wherein the means for receiving comprises means for determining a channel coding configuration for decoding the signal, wherein the channel coding configuration corresponds to the data rate.

28. A mobile station for receiving a signal through a wireless channel from an infrastructure apparatus, the mobile station comprising:
a transmitter configured to transmit to the infrastructure apparatus a data rate control message for each time frame, the data rate control message identifying a maximum data rate for transmission of signals from the infrastructure element to the mobile station over the wireless channel; and
a receiver configured to receive from the infrastructure apparatus the signal at a data rate during a subsequent time frame, wherein the data rate is based on data rate control message.

29. The mobile station of claim 28, wherein the maximum data rate is based on a carrier-to-interference ratio for the wireless channel.

30. The mobile station of claim 29, wherein a packet format of a packet within the signal corresponds to the data rate of the received signal.

31. The mobile station of claim 30, wherein a quantity of user data within the packet is predefined based on the data rate of the received signal.

32. The mobile station of claim 29, wherein the receiver is configured to decode information from the signal using a channel coding configuration, wherein the channel coding configuration corresponds to the data rate of the received signal.

33. The mobile station of claim 29, wherein the receiver is configured to decode information from the signal using a channel coding configuration, wherein the channel coding configuration is predefined based on the data rate of the received signal.

34. A method for high rate packet data communications in a wireless communication system, the method comprising:
determining at each time frame a maximum data rate for data communications on a forward link;
transmitting a Data Rate Control (DRC) message on the reverse link, the DRC message requesting data communications at the maximum data rate; and
receiving data communications at a transmitted data rate based on the maximum data rate.

35. The method as in claim 34, wherein determining at each time frame a maximum data rate comprises:
determining a Carrier-to-Interference (C/I) ratio of data communications received on the forward link; and
determining the maximum data rate as a function of the C/I ratio.

36. The method as in claim 34, wherein determining at each time frame a maximum data rate comprises:
determining a Bit Error Rate (BER) of data communications received on the forward link; and
determining the maximum data rate as a function of the BER.

37. The method as in claim 34, wherein determining at each time frame a maximum data rate comprises:
determining a Packet Error Rate (PER) of data communications received on the forward link; and
determining the maximum data rate as a function of the PER.

38. The method as in claim 34, wherein transmitting the DRC message comprises:
transmitting the DRC message on a dedicated channel on the reverse link.

39. The method as in claim 34, wherein receiving data communications comprises:
demodulating data communications received on a traffic channel of the forward link in accordance with the transmitted data rate; and
decoding data communications received on a traffic channel of the forward link in accordance with the transmitted data rate.

40. A mobile station adapted to communicate high rate packet data communications in a wireless communication system, the mobile station comprising:
- means for determining for each time frame a maximum data rate for data communications on a forward link;
- means for transmitting a Data Rate Control (DRC) message on the reverse link, the DRC message requesting data communications and identifying the maximum data rate; and
- means for receiving data communications at a transmitted data rate, wherein the transmitted data rate is based on the maximum data rate.

41. The mobile station as in claim 40, wherein means for determining at each time frame a maximum data rate comprises:
- means for determining a Carrier-to-Interference (C/I) ratio of data communications received on the forward link; and
- means for determining the maximum data rate as a function of the C/I ratio.

42. The mobile station as in claim 40, wherein means for determining at each time frame a maximum data rate comprises:
- means for determining a Bit Error Rate (BER) of data communications received on the forward link; and
- means for determining the maximum data rate as a function of the BER.

43. The mobile station as in claim 40, wherein determining a maximum data rate comprises:
- means for determining a Packet Error Rate (PER) of data communications received on the forward link; and
- means for determining the maximum data rate as a function of the PER.

44. The mobile station as in claim 40, wherein transmitting the DRC message comprises:
- means for transmitting the DRC message on a dedicated channel on the reverse link.

45. The mobile station as in claim 40, wherein means for receiving data communications comprises:
- means for demodulating data communications received on a traffic channel of the forward link in accordance with the transmitted data rate; and
- means for decoding data communications received on a traffic channel of the forward link in accordance with the transmitted data rate.

46. A method for high rate packet data communications in a wireless communication system, the method comprising:
- selecting at each time slot a maximum data rate for data communications on a forward link; and
- transmitting a Data Rate Control (DRC) message on the reverse link for each time slot, the DRC message requesting data communications and identifying the maximum data rate.

47. The method as in claim 46, Wherein transmitting the DRC message on the reverse link, comprises:
- retransmitting the DRC message on the reverse link.

48. The method as in claim 47, wherein transmitting the DRC message on the reverse link, comprises:
- transmitting DRC messages on the reverse link, wherein each DRC message requests a selected data rate for data communications.

49. A method for high rate packet data communications in a wireless communication system, the method comprising:
- periodically determining a current maximum data rate for data communications on a forward link; and
- periodically transmitting a Data Rate Control (DRC) message on the reverse link, the DRC message requesting data communications at the current maximum data rate.

50. The method as in claim 49, wherein periodically transmitting the DRC message comprises:
- redundantly transmitting a same DRC message on the reverse link during a first time period.

51. A method for high rate packet data communications in a wireless communication system, the method comprising:
- selecting a first current maximum data rate for data communications on a forward link;
- transmitting a Data Rate Control (DRC) message requesting the current maximum data rate;
- selecting a next current maximum data rate for data communications on the forward link;
- and transmitting a relative reference message indicating a relation of the first current maximum data rate to the next current maximum data rate.

* * * * *